United States Patent
Mitamura et al.

(10) Patent No.: US 6,829,053 B1
(45) Date of Patent: Dec. 7, 2004

(54) AIRGAP TYPE ETALON AND APPARATUS UTILIZING THE SAME

(75) Inventors: Nobuaki Mitamura, Sapporo (JP); Hiroshi Nagaeda, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 09/697,179

(22) Filed: Oct. 27, 2000

(30) Foreign Application Priority Data

Jan. 26, 2000 (JP) ........................................ 2000-017126

(51) Int. Cl.$^7$ ............................ G02B 1/10; G02B 5/28; G02F 1/01; H04B 10/12
(52) U.S. Cl. ........................ 356/519; 356/454; 359/588; 359/584; 359/578; 359/337.1; 359/346; 359/238; 359/288; 359/290
(58) Field of Search ................................ 359/588, 584, 359/578, 589, 582, 238, 337.1, 346, 288, 290; 356/519, 454

(56) References Cited

U.S. PATENT DOCUMENTS

| | | | | |
|---|---|---|---|---|
| 5,039,201 A | * | 8/1991 | Liu ............................. | 359/589 |
| 5,167,444 A | * | 12/1992 | Hall ............................ | 385/15 |
| 5,982,488 A | * | 11/1999 | Shirasaki ..................... | 356/519 |
| 6,169,604 B1 | * | 1/2001 | Cao ............................ | 356/519 |
| 6,621,632 B2 | * | 9/2003 | Zhou .......................... | 359/577 |

FOREIGN PATENT DOCUMENTS

| | | |
|---|---|---|
| JP | 3-185402 | 8/1991 |
| JP | 7-27943 | 1/1995 |
| JP | 7-86673 | 3/1995 |
| JP | 9-257567 | 10/1997 |

OTHER PUBLICATIONS

Laikin, Milton, Lens Design, 2$^{nd}$ edition, Marcel Dekker, Inc. New York 1995, pp 18–20, 411–412.*
CVI Laser Optics and Coatings Catalog, year 2000 edition, pp. 390–391.*
Melles Griot, The Practical Application of Light, 1999, pp. 4.1–4.2, 4.16.*
Shirasaki, M. "Temperature Independent Interferometer for WDM Filters" 22$^{nd}$ European Conference of Optical Communication, ECOC'96, Oslo, WeD.1.6, 3.147–3.150.*

* cited by examiner

Primary Examiner—David V. Bruce
Assistant Examiner—Krystyna Suchecki
(74) Attorney, Agent, or Firm—Staas & Halsey LLP

(57) ABSTRACT

An airgap type etalon has a higher degree of design freedom of a wavelength-temperature characteristic so that such a wavelength-temperature characteristic can be freely adjusted. The airgap type etalon includes a fixing block having one flat surface, and a transparent parallel flat plate having parallel flat surfaces formed with an antireflection coating and a reflection augmenting coating thereon, respectively. The flat surface at the antireflection coating side is joined to the flat surface of the fixing block. A parallel flat spacer has a thickness greater than that of the transparent parallel flat plate and an expansion coefficient different from that of the transparent parallel flat plate. One of the flat surfaces of the parallel flat spacer is joined to the flat surface of the fixing block. A transparent flat plate has opposite flat surfaces formed with an antireflection coating and a reflection augmenting coating thereon, respectively. The flat surface at the reflection augmenting coating side is joined to the other of the flat surfaces of the parallel flat spacer, wherein a Fabry-Perot interferometer is formed based on an airgap positioned between the flat surface of the transparent parallel flat plate and the flat surface of the transparent flat plate, which flat surfaces face each other.

12 Claims, 19 Drawing Sheets

GENERAL AIRGAP TYPE ETALON FILTER

AIRGAP TYPE ETALON AND APPARATUS UTILIZING THE SAME

BACKGROUND OF THE INVENTION

1. Field of the Invention

The present invention relates to an airgap type etalon as a Fabry-Perot interferometer, and more particularly to an airgap type etalon capable of freely adjusting temperature dependency of a wavelength characteristic (hereinafter called wavelength-temperature characteristic) and an apparatus utilizing such an etalon.

2. Related Art

Recently, increase of a transmission capacity in optical communications has resulted in adoption of a wavelength division multiplexing (WDM) transmission method. In such a WDM transmission method, wavelengths of different channels have been brought closer to one another for further increase of a transmission capacity. Correct transmission and reception of signal light including channels having such mutually closer wavelengths requires that a wavelength characteristic of an optical filter such as an etalon to be used in a transmission apparatus is stable relative to a change of environmental conditions such as temperature. As such, there is demanded an optical filter having an extremely low wavelength-temperature characteristic.

Further, in long-distance optical transmissions, an erbium (Er)-doped optical fiber amplifier (hereinafter called "EDFA"), for example, has been widely adopted as an optical repeater so as to increase a transmission distance. A gain characteristic of such an EDFA generally has a wavelength characteristic such as based on a composition of an optical fiber and the like. Thus, a technique for flattening such a gain wavelength characteristic of an EDFA has been put to practical use by utilizing, as a gain-equalizer (hereinafter called "GEQ"), an optical filter such as an etalon having a loss wavelength characteristic opposite to the gain wavelength characteristic of the EDFA.

However, since the gain wavelength characteristic of the EDFA is also changed according to the temperature of an erbium-doped optical fiber (EOF), this characteristic is affected by the change of the environmental temperature. As such, deviations of optical SNR's (signal/noise ratios) of optical signals at respective wavelengths have been problematically caused in a WDM transmission apparatus. To deal with this problem, there is desired a gain-equalizer capable of passively flattening the gain wavelength characteristic of the EDFA even when this characteristic is changed due to a temperature change. Unfortunately, realization of such a gain-equalizer requires an optical filter having a higher wavelength-temperature characteristic, contrary to the aforementioned demand for an optical filter.

Further, EDFA's are being widely used in a superlong-distance transmission for undersea repeating. In such usage, a change of an input level of an EDFA due to repair of an optical fiber transmission path and/or a change with time lapse has problematically resulted in a change of the gain of the EDFA when the output level of the EDFA is fixedly controlled. Since the gain change of the EDFA causes an inclination in the wavelength characteristics of the EDFA, there is desired a wavelength characteristic varying apparatus capable of compensating for the inclination of the wavelength characteristic. However, realization of such a wavelength characteristic varying apparatus requires two kinds of optical filters such as having high wavelength-temperature characteristics, respectively, and the respective wavelength temperature characteristics having shift directions opposite to each other.

Concerning such optical filters, various demands are presented not only for transmission wavelength characteristics of the filters but also for the temperature dependencies of such characteristics, corresponding to usage and purpose of the filters. Therefore, such optical filters are needed to be designed in response to these demands. As the aforementioned optical filters, there have been generally used: an etalon (Fabry-Perot interferometer) of a solid type or airgap type; a multilayered dielectric film filter; a fiber Bragg grating (FBG); and the like.

Concrete constitutions of conventional etalons include those such as known from Japanese Unexamined Patent Publication Nos. 7-86673, 3-185402, 7-27943, and 9-257567.

Concerning a multilayered dielectric film filter or an FBG among the aforementioned optical filters, however, materials usable in the manufacturing process are limited to silica ($SiO_2$) and the like, and wavelength-temperature characteristic is determined corresponding to the physical properties (an expansion coefficient; and a temperature coefficient of a refractive index), resulting in a defect that the degree of design freedom is extremely low.

Further, concerning a solid type etalon, although various kinds of transparent multicomponent glass materials can be used, the wavelength-temperature characteristic of the etalon is also determined corresponding to the physical properties (an expansion coefficient; and a temperature coefficient of a refractive index) of the etalons, resulting in a limited degree of design freedom. In this respect, synthetic resins such as acrylic resins and polycarbonate resins are conceivable as transparent materials. However, it is difficult to adopt such synthetic resins as materials of etalons, due to the properties of these resins such as: water absorptivity leading to susceptibility to humidity; poor flatness even after machining; and lower light resistance leading to occurrence of material deterioration upon entrance of light at a higher intensity.

Concerning an airgap type etalon, there has been conventionally used a constitution in which a gap material is interposed between two transparent parallel flat plates such as glass as shown in FIG. 21. Each of the transparent parallel flat plates is formed with an antireflection coating on an outer flat surface and a reflection augmenting coating on an inner flat surface. In such a constitution, the gap material can be provided not only by a transparent material but also by an opaque material, leading to a slightly higher degree of freedom for selecting a material as compared to a solid type etalon. However, gap materials are actually restricted to a glass material and/or some metals in view of stability for the environment and machinability into a flat surface. Accordingly, in the present state, a sufficient degree of design freedom for wavelength-temperature characteristic is hardly obtained.

As described above, it has been rather difficult to actually obtain a desired wavelength-temperature characteristic in conventional optical filters. Also, since suitable optical filters have not been obtained in various devices such as wavelength detecting devices, gain-equalizers, and wavelength characteristic varying devices, which devices need optical filters having predetermined wavelength-temperature characteristics, there has been a problem in that a desired performance can not be achieved.

There will be now concretely explained problems of conventional etalons described in the aforementioned publications.

Firstly, the etalon described in Japanese Unexamined Patent Publication No. 7-86673 includes a gap material constituted by mutually joining a material having a positive expansion coefficient and another material having a negative expansion coefficient, for the purpose of eliminating a temperature dependent change of a gap length of the airgap type etalon to thereby eliminate wavelength-temperature characteristic. In such a constitution, it is possible to realize an etalon having a lower wavelength-temperature characteristic, but it will be difficult to also provide an etalon having a higher wavelength-temperature characteristic. Further, in constituting an etalon utilizing this conventional technique, it is required to adopt a specific ceramic material such as having a negative expansion coefficient, leading to a defect that the degree of design freedom for wavelength-temperature characteristics is restricted. Moreover, the ratio of thickness between two gap materials is determined by the expansion coefficients of respective materials. Thus, in setting a larger free spectral range (hereinafter called "FSR") and a shorter gap length, a thin gap material is required. However, realization of such a thin gap material is predicted to be difficult to manufacture, resulting in a problem of an impractical gap material.

Next, the etalon described in Japanese Unexamined Patent Publication No. 3-185402 or 9-257567 has a constitution in which a material having an expansion at coefficient different from that of a solid type etalon is joined to the periphery of the solid type etalon, so that the material acts to apply a thermal strain and a thermal stress to the etalon upon temperature change, to thereby eventually maintain the optical thickness (coherence length) of the etalon to be constant. Even in such a constitution, however, it is difficult to realize an etalon having a higher wavelength-temperature characteristic, and there is even such a possibility of breakage of the etalon due to the positive application of the thermal strain and thermal stress.

Meanwhile, the etalon described and established in Japanese Unexamined Patent Publication No. 7-27943 has a constitution in which a solid type etalon and an airgap type etalon are combined with each other. If the temperature rises, the optical thickness (coherence length) of the solid type etalon is increased due to the thermal expansion and the increase of refractive index thereof while the optical thickness of the airgap type etalon is decreased so as to offset such an increased optical thickness, to thereby eventually maintain the total optical thickness of the etalon to be constant. Even in such a constitution, however, it is difficult to realize an etalon having a higher wavelength-temperature characteristic, and there is such a defect that the degree of design freedom of the wavelength-temperature characteristic is restricted as described above due to the partial inclusion of the solid type etalon.

SUMMARY OF THE INVENTION

The present invention has been carried out in view of the conventional problems as described above, and it is therefore an object of the present invention to provide an airgap type etalon having a higher degree of design freedom of a wavelength-temperature characteristic so that such a wavelength-temperature characteristic can be freely adjusted, and to provide an apparatus utilizing such an etalon.

To achieve the above object, an airgap type etalon according to the present invention comprises: a fixing member having at least one flat surface; a first parallel member, which is transparent to incident light and has parallel flat surfaces, one of the parallel flat surfaces thereof being joined to the flat surface of the fixing member; at least one second parallel member, which has parallel flat surfaces in which a distance between the parallel flat surfaces thereof is greater than a distance between the parallel flat surfaces of the first parallel member, and has an expansion coefficient different from that of the first parallel member, one of the flat surfaces of the second parallel member being joined to the flat surface of the fixing member so as to surround the outer periphery of the first parallel member; and a transparent member, which is transparent to incident light and has opposite flat surfaces, one of the flat surfaces thereof being joined to the other flat surface of the second parallel member opposite to the joined surface to the fixing member; wherein a Fabry-Perot interferometer is formed based on an airgap positioned between the flat surface of the first parallel member and the flat surface of the transparent member facing each other.

According to such a constitution, the light input into the airgap type etalon of the present invention is reflected multiple times between the parallel flat surface of the first parallel member and the flat surface of the transparent member facing each other, to thereby generate Fabry-Perot interference. The length of the airgap formed between the reflecting surface of the first parallel member and the reflecting surface of the transparent member is to be determined by a difference in thickness between the first parallel member and the second parallel member (i.e., by a distance between the parallel flat surfaces), on the basis of the flat surface of the fixing member. In this way, it becomes possible to use the thicknesses and expansion coefficients of the first and second parallel members as design parameters even when the optical distance of the airgap has been determined corresponding to a required optical characteristic. By suitably setting these design parameters, it becomes possible to widely adjust the temperature dependency of the transmission wavelength characteristic of the etalon.

A concrete constitution of the airgap type etalon may be such that the fixing member has a through-hole for passing light therethrough, the first parallel member is formed with an antireflection coating on one flat surface thereof, and this flat surface formed with the antireflection coating is joined to the flat surface of the fixing member around the through-hole, and the transparent member is formed with an antireflection coating on one flat surface of the transparent member opposite to the joined surface of the transparent member to the second parallel member.

Alternatively, the constitution may be such that the fixing member is transparent to incident light, and is formed with an antireflection coating on a surface opposite to the flat surface thereof, and the transparent member is formed with an antireflection coating on the other flat surface thereof opposite to the joined surface of the transparent member to the second parallel member.

Further, concerning the airgap type etalon, reflection augmenting coatings may be formed on the flat surfaces of the first parallel member and the transparent member facing each other, respectively.

According to such a constitution, there can be obtained a required maximum loss by forming the reflection augmenting coatings on the flat surfaces of the first parallel member and the transparent member, respectively, in case of insufficient Fresnel reflection at each of the flat surfaces of the first parallel member and transparent member facing each other.

A wavelength detecting apparatus according to the present invention comprises: a first branching portion and a second branching portion for extracting branched light from a main light path, respectively; an optical filter for transmitting the branched light from the first branching portion and for giving a wavelength characteristic to the thus transmitted light; a first light receiving portion for converting the transmitted light from the optical filter into an electrical signal; and a second light receiving portion for converting the branched light from the second branching portion into an electrical signal, wherein the optical filter is constituted by employing the airgap type etalon of the present invention, and wherein the thicknesses and expansion coefficients of the first and second parallel members are set so that the temperature dependency of the transmission wavelength characteristic becomes 1 pm/° C. or less.

According to such a constitution, the first light receiving portion generates an electrical signal having a wavelength characteristic corresponding to the characteristic of the optical filter, and the wavelength of light input into the wavelength detecting apparatus is detected based on the electrical signal obtained by the first light receiving portion and a reference electrical signal obtained by the second light receiving portion. This wavelength detection is performed based on the optical characteristic of the airgap type etalon having a small temperature dependency of the transmission wavelength characteristic, so that the temperature dependency of the detected wavelength is reduced. This type of wavelength detecting apparatus can be utilized as a so-called wavelength locker, for example, by being combined with a semiconductor laser diode.

A gain-equalizer according to the present invention comprises: a plurality of optical filters having periodical transmission wavelength characteristics shifted from one another by an approximately ½ cycle at a predetermined temperature, in which the respective transmission wavelength characteristics have mutually different temperature dependencies such that a transmission wavelength characteristic obtained by synthesizing the transmission wavelength characteristics of the plurality of optical filters is passively varied corresponding to a temperature change, wherein at least one of the plurality of optical filters is constituted by employing the airgap type etalon of the present invention, and the thicknesses and expansion coefficients of the first and second parallel members are set so that the temperature dependency of the transmission wavelength characteristic of the airgap type etalon becomes 25 pm/° C. or more.

According to such a constitution, there can be performed gain-equalization following a temperature change, in accordance with the transmission wavelength characteristic obtained by synthesizing the transmission wavelength characteristics of the plurality of optical filters including the airgap type etalon having a large temperature dependency of the transmission wavelength characteristic. This type of apparatus is suitable, for example, as compensation means for flattening a wavelength characteristic of an optical signal output from an optical amplifier having a larger temperature dependency of gain wavelength characteristic.

A wavelength characteristic varying apparatus according to the present invention comprises: a plurality of optical filters having periodical transmission wavelength characteristics, in which the transmission wavelength characteristics have mutually different temperature dependencies; and temperature controlling means for controlling the temperature of the plurality of optical filters such that an inclination amount of a transmission wavelength characteristic obtained by synthesizing the transmission wavelength characteristics of the plurality of optical filters can be positively varied by a temperature control by the temperature controlling means, wherein the plurality of optical filters are constituted by employing at least two airgap type etalons of the present invention, and the thicknesses and expansion coefficients of the first and second parallel members are set so that the temperature dependency of each of the transmission wavelength characteristics becomes 25 pm/° C. or more and the shift directions of temperature dependencies of transmission wavelength characteristics of the airgap type etalons are opposite to each other.

According to such a constitution, since the plurality of optical filters are constituted by employing the airgap type etalons having large temperature dependencies of transmission wavelength characteristics in which the shift directions of temperature dependencies of transmission wavelength characteristics are opposite to each other, the transmission wavelength characteristics of the airgap type etalons are shifted in the directions opposite to each other when the temperatures of the optical filters is changed by the temperature controlling means. In this way, it becomes possible to vary the inclination amount of the transmission wavelength characteristic obtained by synthesizing the transmission wavelength characteristics of the plurality of optical filters by the temperature control. This type of apparatus is suitable, for example, as compensation means for flattening a wavelength characteristic of an optical signal output from an optical amplifier having a gain wavelength characteristic which varies corresponding to an operating condition.

Other objects, features and advantages of the present invention will become more apparent from the following description of preferred embodiments when read in conjunction with the accompanying drawings.

DETAILED DESCRIPTION OF THE PREFERRED EMBODIMENT

There will be described hereinafter embodiments according the present invention, with reference to the accompanying drawings.

Figure 1:
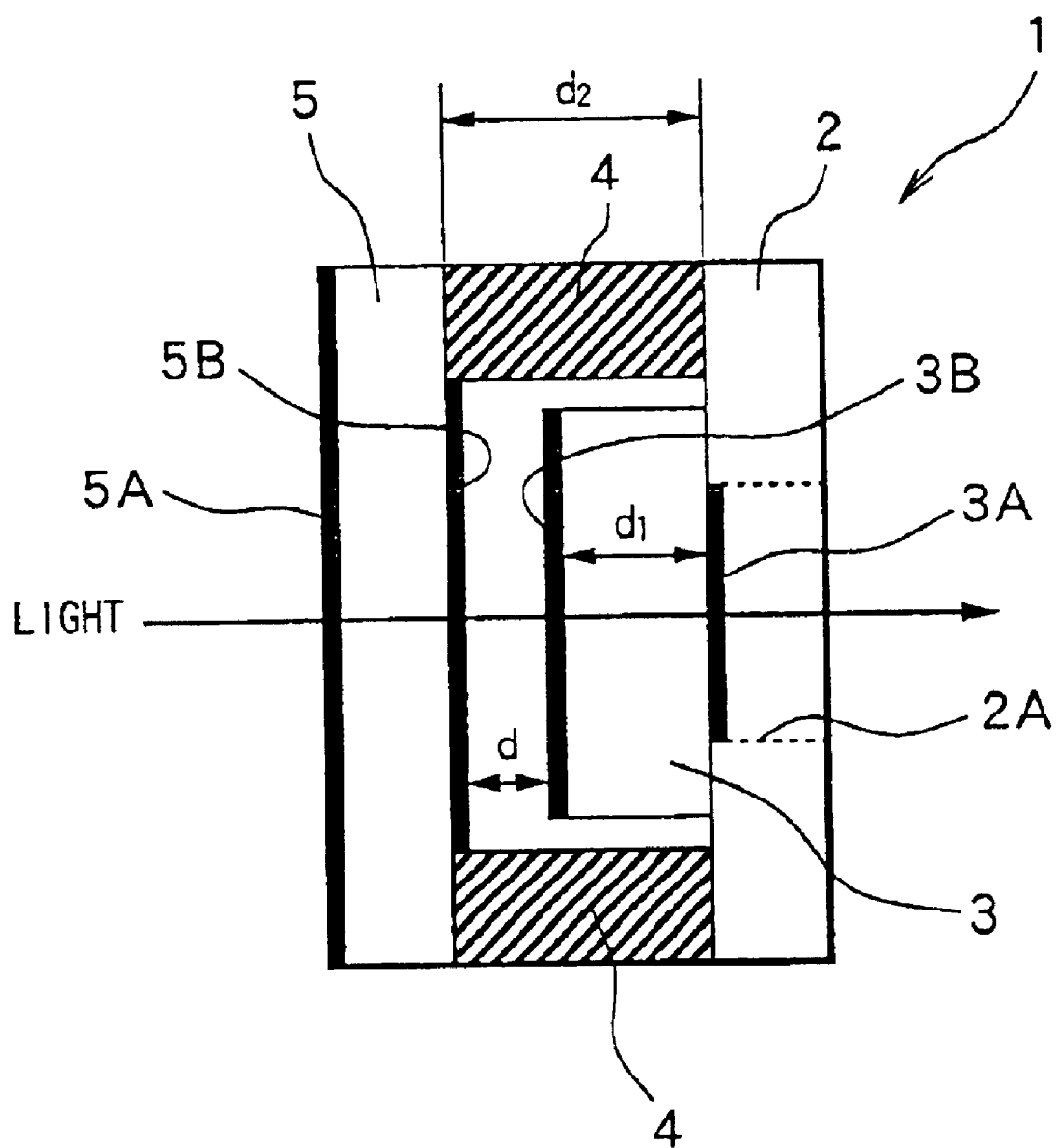
FIG. 1 is a cross-sectional view showing a constitution of a first embodiment of an airgap type etalon according to the present invention.

FIG. 1 is a cross-sectional view showing a constitution of a first embodiment of an airgap type etalon according to the present invention.

In FIG. 1, this etalon 1 is exemplarily constituted of: a fixing block 2 as a fixing member; a transparent parallel flat plate 3 as a first parallel member; a parallel flat plate 4 as a second parallel member; and a transparent flat plate 5 as a transparent member.

The fixing block 2 includes, for example, a through-hole 2A for transmitting light therethrough, and has a flat surface at one side (left side face in the figure). This fixing block 2 is not necessarily transparent to incident light and may be formed of an opaque material such as metal, since the area other than the through-hole 2A of the fixing block 2 does not transmit light therethrough. Further, the other side (right side face in the figure) is not necessarily flat.

The transparent parallel flat plate 3 is formed with an antireflection coating 3A at one flat surface (right side face in the figure) and a reflection augmenting coating 3B at the other flat surface (left side face in the figure). This transparent parallel flat plate 3 is formed of a material transparent to incident light, in which $d_1$ designates a distance (hereinafter called thickness of transparent parallel flat plate 3) between the one and the other flat surfaces of the plate 3, and $\alpha_1$ designates a linear expansion coefficient of the plate 3. Further, the flat surface formed with the antireflection coating 3A is joined to the periphery of the through-hole 2A on the one flat surface of the fixing block 2. The joining method to the fixing block 2 includes optical contact, thermal diffusion and the like. For example, the antireflection coating 3A and reflection augmenting coating 3B are formed of multilayered dielectric films.

The parallel flat plate 4 is formed to have its thickness $d_2$ (distance between parallel flat surfaces of parallel flat plate 4) greater than the thickness $d_1$ of the transparent parallel flat plate 3, and one flat surface (right side face in the figure) of this parallel flat plate 4 is joined to the flat surface (left side face in the figure) of the fixing block 2 so that this parallel flat plate 4 surrounds the outer periphery of the transparent parallel flat plate 3 (at the upper and lower positions of the transparent parallel flat plate 3 in the figure). This parallel flat plate 4 is formed of a material having an expansion coefficient $\alpha_2$ different from the linear expansion coefficient $\alpha_1$ of the transparent parallel flat plate 3. Further, since the parallel flat plate 4 does not transmit light, the material of this parallel flat plate 4 is not necessarily transparent and may be an opaque material such as metal. Note, the parallel flat plate 4 may be constituted of: a single (integral) member having a configuration required to surround the transparent parallel flat plate 3 or a combination of a plurality of parallel flat plates having constituent materials and thicknesses identical to one another.

The transparent flat plate 5 is formed with an antireflection coating 5A at one flat surface (left side face in the figure) and a reflection augmenting coating 5B at the other flat surface (right side face in the figure), and the flat surface formed with the reflection augmenting coating 5B is joined to the flat surface opposite to the fixing block 2 (left side face in the figure) of the parallel flat plate 4. This transparent flat plate 5 is not necessarily, a parallel flat plate, and for example, the angle formed between both flat surfaces of the plate 5 may be inclined by a few degrees, so as to restrict Fabry-Perot interference between the flat surface formed with the antireflection coating 5A and the flat surface formed with the reflection augmenting coating 5B.

In the airgap type etalon 1 having the aforementioned constitution, there is an formed a Fabry-Perot interferometer at the airgap positioned between the flat surface formed with the reflection augmenting coating 3B of the transparent parallel flat plate 3 and the flat surface formed with the reflection augmenting coating 5B of the transparent flat plate 5. Note, the length of the airgap is designated as $d(=d_2-d_1)$ herein.

There will be explained hereinafter the function of the etalon 1 having the aforementioned constitution.

Firstly, there will be generally explained a wavelength characteristic of a typical etalon.

The wavelength characteristic, i.e., a relationship between a transmissivity It and a wavelength $\lambda$, is generally given by the following equation (1):

$$It = 1/\{(1+4R \times \sin^2(2\pi \times n \times d \times \cos\theta/\lambda)/(1-R)^2\} \quad (1),$$

wherein: R is reflectance of a reflection coating, n is a refractive index of the gap, d is a physical distance of the gap, and $\theta$ is an incident angle of light.

The equation (1) shows that wavelengths where the transmissivity becomes the maximum (each of which is called central wavelength $\lambda c$ hereinafter), periodically exist in the wavelength characteristic of an etalon. Here, the central wavelength $\lambda c$ is given by the following equation (2):

$$\lambda c = 2 \times n \times d \times \cos \theta / m \quad (2),$$

wherein, m is the number of order.

Figure 2:
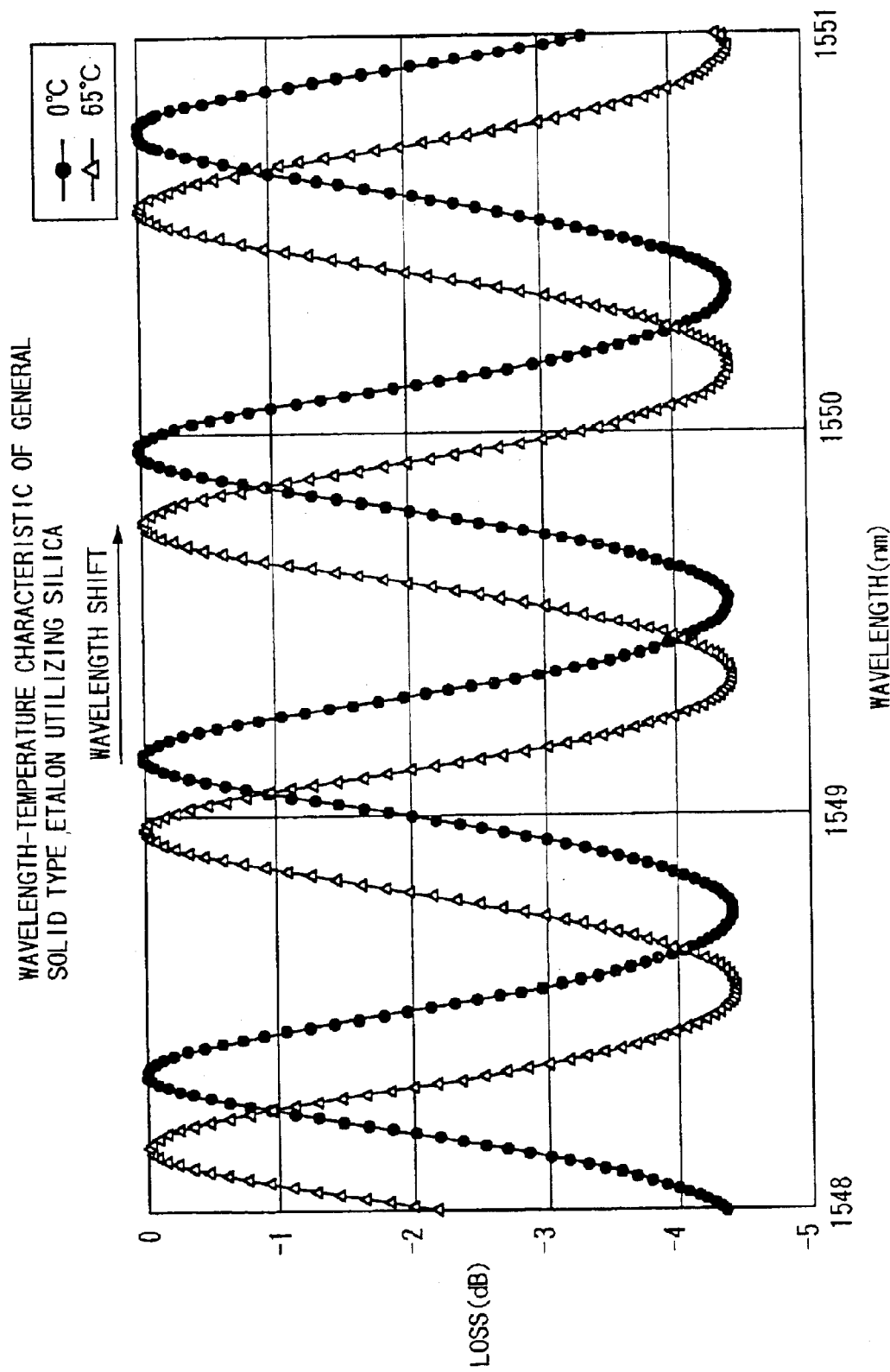
FIG. 2 is a diagram showing a wavelength-temperature characteristic of a general solid type etalon utilizing silica.

The equation (2) shows that the central wavelength λc is proportional to the product n×d (i.e., optical distance) of the refractive index n and airgap length d of the gap. Thus, changes of the refractive index n of the gap and of the airgap length d thereof due to a change of the ambient temperature lead to a change of the optical distance n×d, to thereby change the central wavelength λc. Namely, the wavelength characteristic of an etalon is shifted in a wavelength direction. For example, FIG. 2 shows a wavelength-temperature characteristic of a general solid type etalon utilizing silica.

Figure 21:
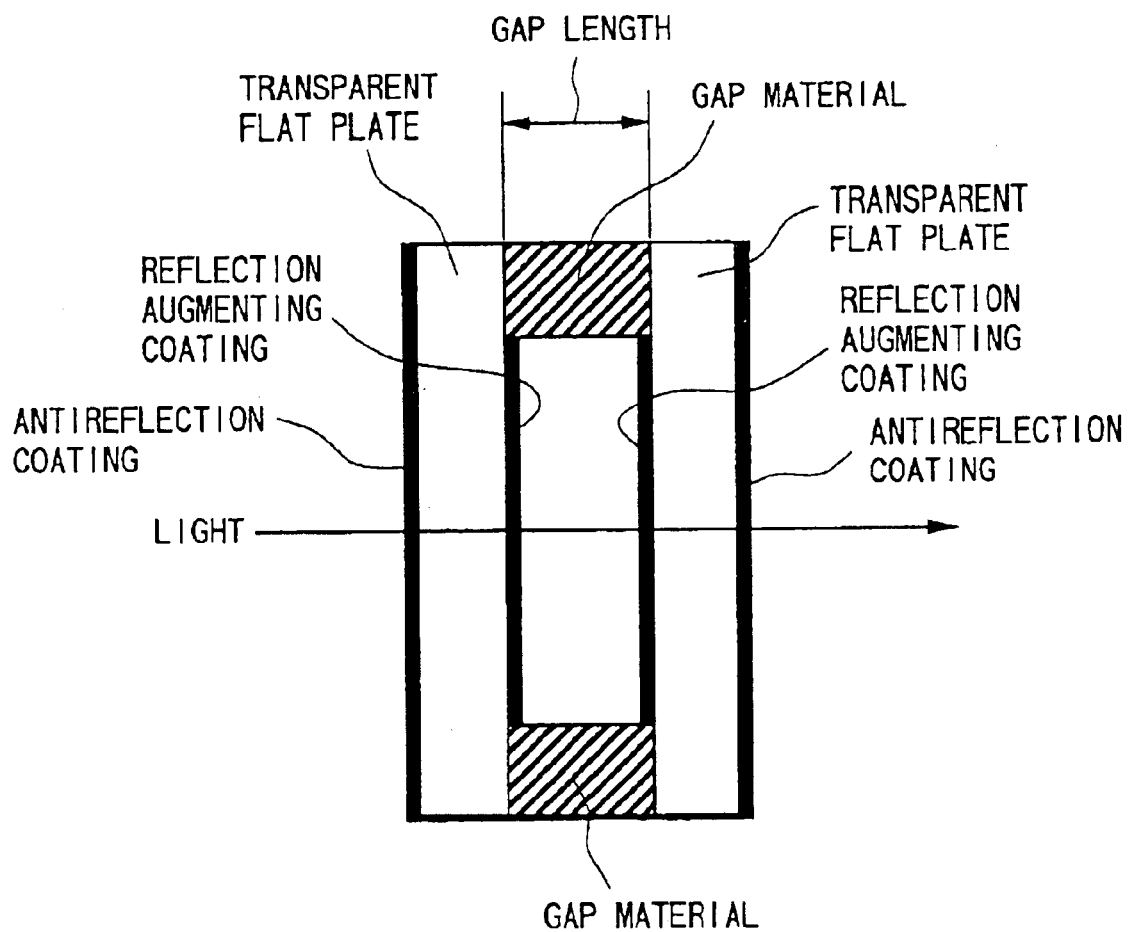
FIG. 21 is a cross-sectional view showing a constitution of a conventional airgap type etalon.

Further, for the aforementioned conventional airgap type etalon as shown in FIG. 21, the wavelength-temperature characteristic thereof is determined by a thermal change of the refractive index of the gap air and a thermal change of the thickness (distance) of the gap material (that is, thermal expansion). Generally, when the change of temperature is Δt degrees, the resultant refractive index n' and thickness d' are defined by the following equations (3) and (4):

$$n' = n + n_t \times \Delta t \quad (3),$$

$$d' = d + d \times \alpha \times \Delta t \quad (4),$$

wherein $n_t$ is a temperature coefficient of the refractive index of the gap, and α is a linear expansion coefficient of the gap material.

Thus, a change amount of the optical distance n×d per 1° C. for the airgap type etalon can be represented by the following equation (5), based on the equations (3) and (4):

$$n'd' - nd = (n\alpha + n_t + n_t \alpha)d = n\alpha d + n_t d \quad (5),$$

assuming that $n_t \alpha \approx 0$, here.

In the equation (5), the physical distance d of the airgap in a conventional airgap type etalon is determined corresponding to the required wavelength characteristic, since the refractive index n of the air within the open gap is principally 1.000264 and the temperature coefficient $n_t$ thereof is univocally $-8.1 \times 10^{-7}/°$ C. Only, the linear expansion coefficient α can be varied by duly selecting a gap material. As such, the conventional airgap type etalon has a degree of design freedom for the linear expansion coefficient α only.

In contrast, in the airgap type etalon 1 of this embodiment of the present invention as shown in FIG. 1, Fabry-Perot interference is formed within the airgap between the reflection augmenting coating 3B on the transparent parallel flat plate 3 and the reflection augmenting coating 5B on the transparent flat plate 5. However, this etalon 1 noway includes such a constitution to interpose a gap material between two sheets of flat plates 3 and 5, and rather the transparent parallel flat plate 3 (thickness $d_1$, linear expansion coefficient $\alpha_1$) and the parallel flat plate 4 (thickness $d_2$, linear expansion coefficient $\alpha_2$) thicker than the plate 3 by "d" are fixed to each other, on the basis of the flat surface of the fixing block 2 as a reference surface so that the airgap length is the difference $d = d_2 - d_1$ between the thickness of the flat plate 3 and the thickness of the flat spacer 4. Thus, even when the airgap length d has been determined by the required optical characteristics, the thicknesses $d_1$, $d_2$ can be freely varied, and the linear expansion coefficients $\alpha_1$, $\alpha_2$ of the flat plate 3 and flat spacer 4 serve as design parameters, respectively.

Concretely, a change amount of an optical distance n×d per 1° C. for the airgap type etalon 1 of this embodiment can be represented by the following equation (6):

$$n'd' - nd = (n + n_1) \times \{(d_2 + d_2\alpha_2) - (d_1 + d_1\alpha_1)\} - n(d_2 - d_1) \quad (6)$$

$$\approx (n + n_1)(d_2\alpha_2 - d_1\alpha_1) + n_t d.$$

As understood, the equation (6) includes an increased number of parameters, as compared to the aforementioned equation (5). In addition, it is expected that the larger the thicknesses $d_1$, $d_2$, the larger the optical distance n×d relative to temperature, i.e., the larger the change amount of the wavelength-temperature characteristic. Further, the wavelength-temperature characteristic can be extremely diminished by selecting the parameters $d_1$, $\alpha_1$, $d_2$ and $\alpha_2$ such that the value of the equation (6) just becomes zero. Moreover, by selecting materials such that $\alpha_1 > \alpha_2$, it also becomes possible to render the etalon 1 to possess a negative wavelength-temperature characteristic (in which the wavelength characteristic is shifted in a shorter wavelength direction upon temperature rise).

Next, the optical characteristics required for the etalon 1 of the first embodiment will be concretely set and explained in detail hereinafter.

There will be now considered, for example, a setting condition for the optical characteristics of the etalon 1 such that the etalon 1 has the wavelength characteristic in which the free spectral range (FSR) representing a span of a transmission peak wavelength is 0.8 nm, and the maximum loss is −4.5 dB and the wavelength-temperature characteristic becomes substantially zero. Note, the optical characteristics of the airgap type etalon according to the present invention are not limited to the above setting.

Firstly, based on the condition that FSR=0.8 nm and the maximum loss=−4.5 dB, the airgap length d is determined to be 1.5 mm, and the reflectances of the reflection augmenting coatings 3B, 5B are determined to be 25%, respectively. In the etalon 1 of this embodiment, since the airgap length d is determined by the difference between the thickness $d_1$ of the transparent parallel flat plate 3 and the thickness $d_2$ of the parallel flat plate 4, each of thicknesses $d_1$, $d_2$ has its degree of design freedom, even if the airgap length d is determined to be 1.5 mm. Further, since the transparent parallel flat plate 3 and parallel flat plate 4 are formed of heterogeneous materials having expansion coefficients different from each other, respective expansion coefficients can be freely combined with each other. In this embodiment, design values of respective parameters were set as shown in the following Table 1, so as to render the wavelength-temperature characteristic of the etalon 1 to be substantially zero, while assuming that the refractive index n of air is 1.000264 and the temperature coefficient nt is $-8.1 \times 10^{-7}/°$ C.

TABLE 1

| | Material | Linear Expansion Coefficient (/°0 C.) | Thickness (nm) |
|---|---|---|---|
| transparent parallel flat plate 3 | S-LAM60 | $\alpha_1 = 1.33 \times 10^{-5}$ | $d_1 = 0.87$ |
| parallel flat plate 4 | S-FPL51 | $\alpha_2 = 5.40 \times 10^{-6}$ | $d_2 = 2.37$ |

In Table 1, selected as the materials of the transparent parallel flat plate 3 and parallel flat plate 4 were both commercially available general optical glasses (manufactured by Ohara Inc.) having high chemical durability. Glass is a suitable material, since it has high transparency, can be readily fabricated into a transparent parallel flat plate having high parallelism such as by mechanical or chemical abrasion, and is allowed to exhibit a thickness precision on the order of 0.0001 mm. The material of the transparent flat plate 5 is not particularly limited, and either of the glass materials of Table 1 can be used. Meanwhile, as the fixing block 2, opaque materials such as metal can be used, and glass may be of course used.

Figure 3:
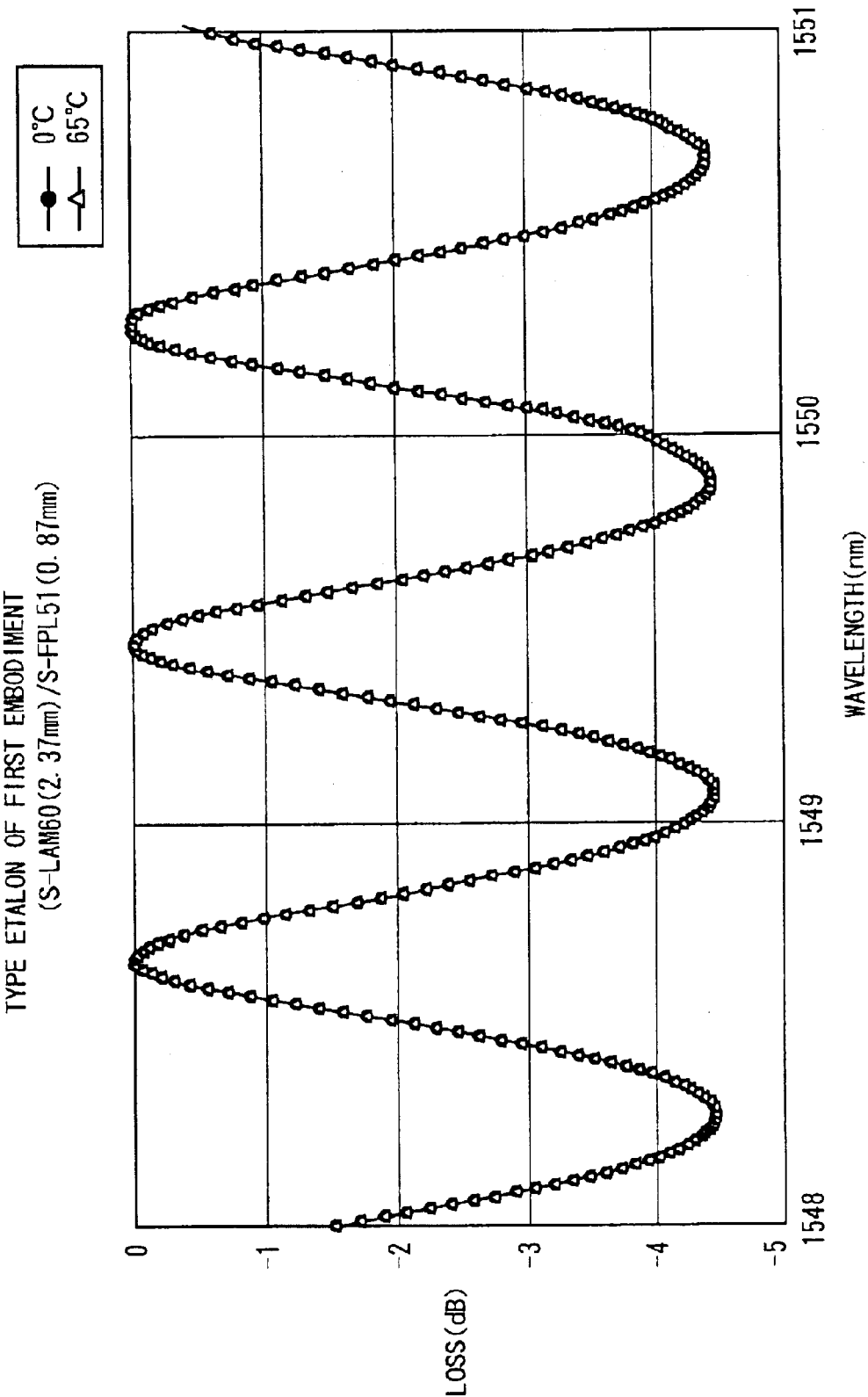
FIG. 3 is a diagram showing a measured result of a wavelength-temperature characteristic of the etalon of the first embodiment.

FIG. 3 is a diagram showing a measured result of the wavelength-temperature characteristic of the etalon 1 under the aforementioned setting condition. As shown in FIG. 3, substantially no wavelength shifts were observed in the etalon 1 even by the temperature difference between 0° C. and 65° C., thereby demonstrating that the wavelength-temperature characteristic of the etalon 1 was substantially zero.

The functions and effects of the etalon 1 of this embodiment shall be now compared with those of the conventional etalon shown in the above referenced FIG. 21.

In the conventional etalon, the thickness of the gap material is determined to be 1.5 mm and the reflectance of the reflection augmenting coating is determined to be 25%, so as to realize the optical characteristics identical with the first embodiment (FSR=0.8 nm and the maximum loss=−4.5 dB). To render the wavelength-temperature characteristic to be zero, a material having a linear expansion coefficient $\alpha$=+8.1×10$^{-7}$/° C. is required as a gap material, assuming that the refractive index n of air is n=1.000264 and the temperature coefficient $n_t$ of the refractive index is $n_t$=−8.1×10$^{-7}$/° C . However, materials having such a characteristic can be hardly found. Thus, silica ($\alpha$=5.5×10$^{-7}$/° C.) having a characteristic closest to the aforementioned characteristic was adopted as a gap material.

Figure 4:
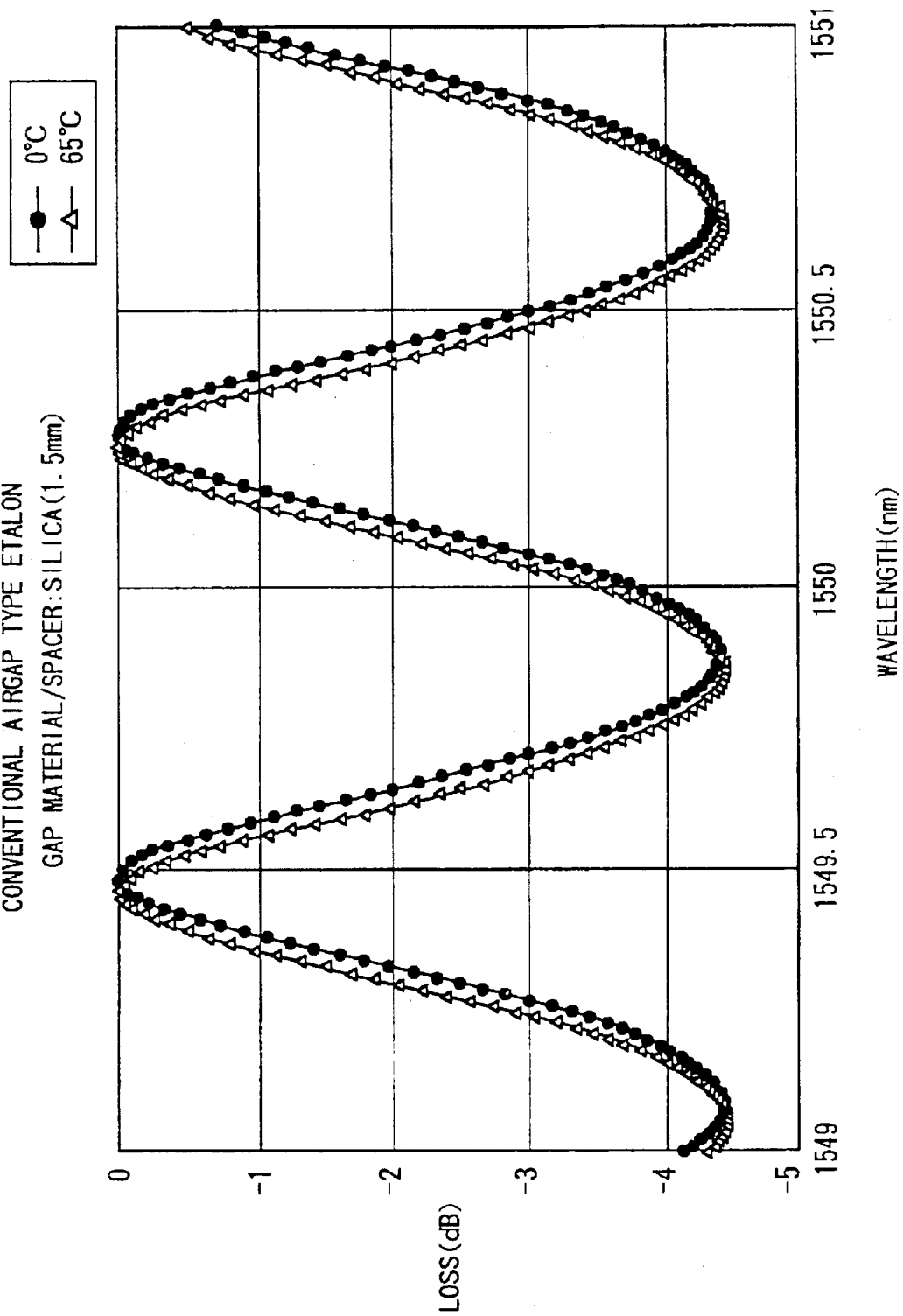
FIG. 4 is a diagram showing a wavelength-temperature characteristic of a general airgap type etalon utilizing silica.

FIG. 4 is a diagram showing the wavelength-temperature characteristic of the conventional airgap type etalon utilizing silica as a gap material. As shown in FIG. 4, there is caused a wavelength-temperature characteristic exceeding −1 pm/° C., in the etalon having the conventional constitution. Such an etalon is not sufficient for usage where stability of wavelengths upon temperature change is strictly required. Note, shifting of peak wavelengths toward the shorter wavelength side upon the rise of temperature from 0° C. to 65° C. is due to the reduction of the refractive index of air. Contrary, the airgap type etalon 1 of this embodiment has a wavelength characteristic of substantially zero between 0° C. and 65° C. as shown in FIG. 3, thus the etalon 1 can be sufficiently used for the aforementioned strict usage.

According to the first embodiment as described above, it becomes possible to readily realize an airgap type etalon having a wavelength-temperature characteristic of substantially zero with a higher degree of design freedom even by using a general material.

There will be described a second embodiment of an airgap type etalon according to the present invention.

Figure 5:
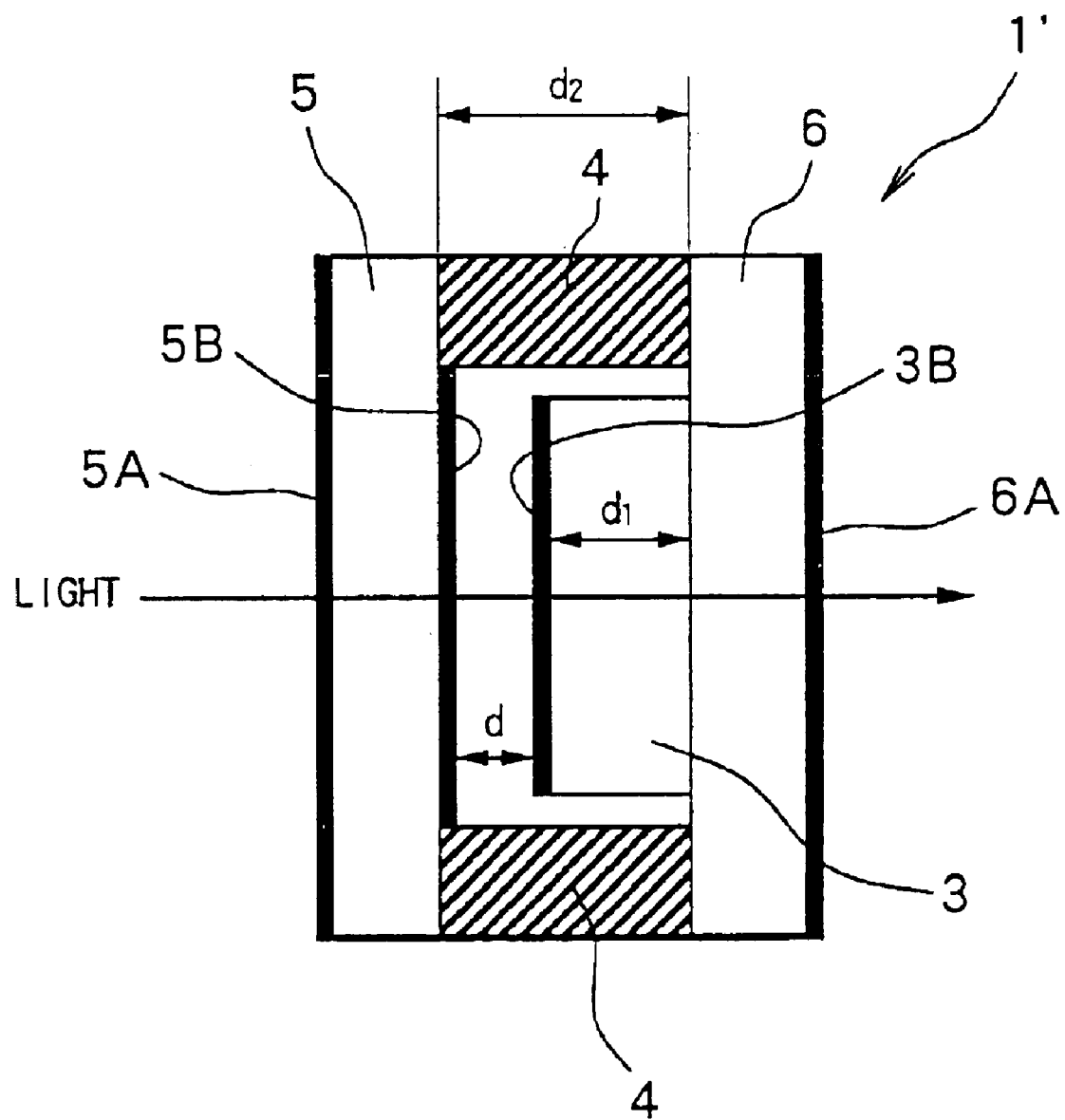
FIG. 5 is a cross-sectional view showing a constitution of a second embodiment of an airgap type etalon according to the present invention.

FIG. 5 is a cross-sectional view showing a constitution of an airgap type etalon according to the second embodiment. Like reference numerals as used for the first embodiment are used to denote corresponding elements in this figure.

In FIG. 5, an etalon 1' of this embodiment is constituted of a transparent fixing block 6 as a fixing member, a transparent parallel flat plate 3, a parallel flat plate 4 and a transparent flat plate 5.

The transparent fixing block 6 is a flat plate with one side being a flat surface; and the other side formed with an antireflection coating 6A identical with the antireflection coating 3A formed on one side of the transparent parallel flat plate 3 in the first embodiment. Note, the other side formed with the antireflection coating 6A is not necessarily a flat surface.

Differently from the first embodiment, the transparent parallel flat plate 3 in this embodiment is not formed with an antireflection coating at one flat surface (right side face in the figure) but formed with a reflection augmenting coating 3B only at the other flat surface (left side face in the figure). In the same joining manner with the first embodiment, the one flat surface of the transparent parallel flat plate 3 is joined to the flat surface, which is not formed with the antireflection coating 6A, of the transparent fixing block 6. Identically with the first embodiment, this transparent parallel flat plate 3 has a thickness $d_1$ and a linear expansion coefficient $\alpha_1$.

The constitutions of the parallel flat plate 4 and transparent flat plate 5 are identical with those of the first embodiment.

In the airgap type etalon 1' having the aforementioned constitution, there is formed a Fabry-Perot interferometer at the airgap positioned between the flat surface formed with the reflection augmenting coating 3B of the transparent parallel flat plate 3 and the flat surface formed with the reflection augmenting coating 5B of the transparent flat plate 5.

The difference of the constitution of the second embodiment from that of the first embodiment is now summarized that: the constitution of the second embodiment requires the antireflection coating 6A at one side of the transparent fixing block 6 so as to transmit light through this block 6; and the difference between the refractive indexes at the joining interface between the transparent fixing block 6 and the transparent parallel flat plate 3 is so small that substantially no reflection is caused at the joining interface, thereby omitting a specific antireflection coating at the joining side of the transparent parallel flat plate 3.

Similarly to the first embodiment, there will be now set concrete optical characteristics for the second embodiment such that the etalon 1' has the wavelength characteristic in which the FSR is 0.8 nm, and the maximum loss is −4.5 dB, and the wavelength-temperature characteristic becomes substantially zero. Under such a setting condition, design values of respective parameters were provided in the manner shown in Table 2.

TABLE 2

| | Material | Linear Expansion Coefficient (/° 0 C.) | Thickness (nm) |
|---|---|---|---|
| transparent parallel flat plate 3 | S-LAH60 | $\alpha_1$ = 1.24 × 10$^{-5}$ | $d_1$ = 1.05 |
| parallel flat plate 4 | S-FPL52 | $\alpha_2$ = 5.60 × 10$^{-6}$ | $d_2$ = 2.55 |

In Table 2, materials of the transparent parallel flat plate 3 and parallel flat plate 4 were both commercially available general optical glasses (manufactured by Ohara Inc.) having higher chemical durability, and were different from those of the first embodiment shown in Table 1, respectively. As such, the linear expansion coefficients and thicknesses of the transparent parallel flat plate 3 and parallel flat plate 4 are different from those of the first embodiment, respectively. Further, since the transparent fixing block 6 and transparent flat plate 5 are not limited to particular materials, either of the glass materials of Table 2 can be used.

Figure 6:
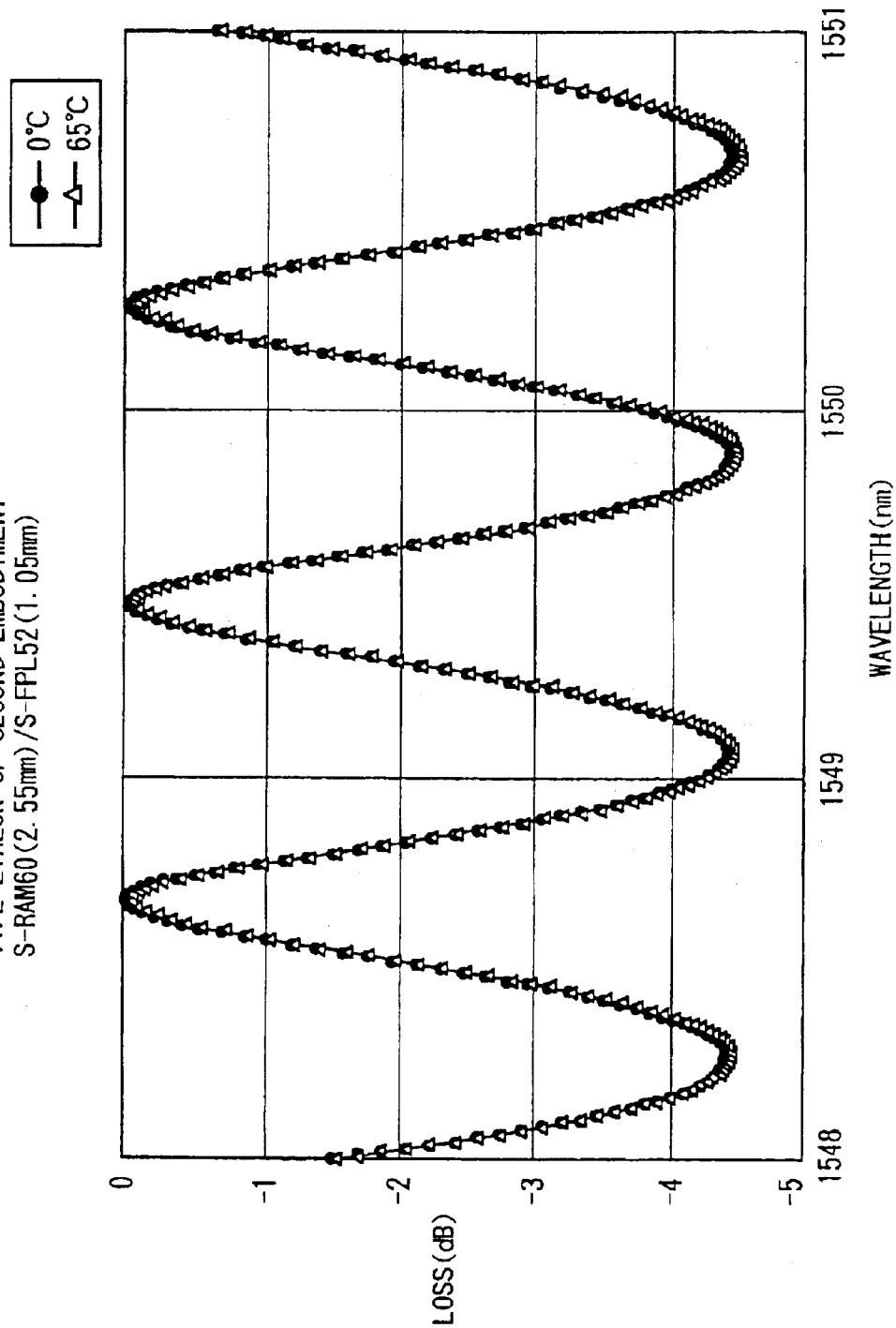
FIG. 6 is a diagram showing a measured result of a wavelength-temperature characteristic of the etalon of the second embodiment.

FIG. 6 is a diagram showing a measured result of the wavelength-temperature characteristic of the etalon 1' under the aforementioned setting condition. As shown in FIG. 6, substantially no wavelength shifts were observed in the etalon 1' even by the temperature difference between 0° C. and 65° C., thereby demonstrating that the wavelength-temperature characteristic of the etalon 1' was at substantially zero.

According to the second embodiment as described above, there can be obtained an effect equivalent to the first embodiment.

In the aforementioned first and second embodiments, respective parameter values have been set such that the wavelength-temperature characteristics of airgap type etalons 1, 1' become substantially zero. However, the present invention is not limited thereto. For example, as explained concerning the aforementioned equation (6), it is possible to increase the wavelength-temperature characteristic of the etalon by increasing the thicknesses $d_1$, $d_2$ of the transparent parallel flat plate 3 and the parallel flat plate 4, and it is also possible to realize an etalon having a negative wavelength-temperature characteristic by selecting materials such that the linear expansion coefficients of the transparent parallel flat plate 3 and parallel flat spacer 4 become $\alpha_1 > \alpha_2$. Concrete setting examples shall be explained in embodiments of respective devices to be described later.

There will be now described embodiments of apparatus utilizing the airgap type etalon according to the present invention.

Figure 7:
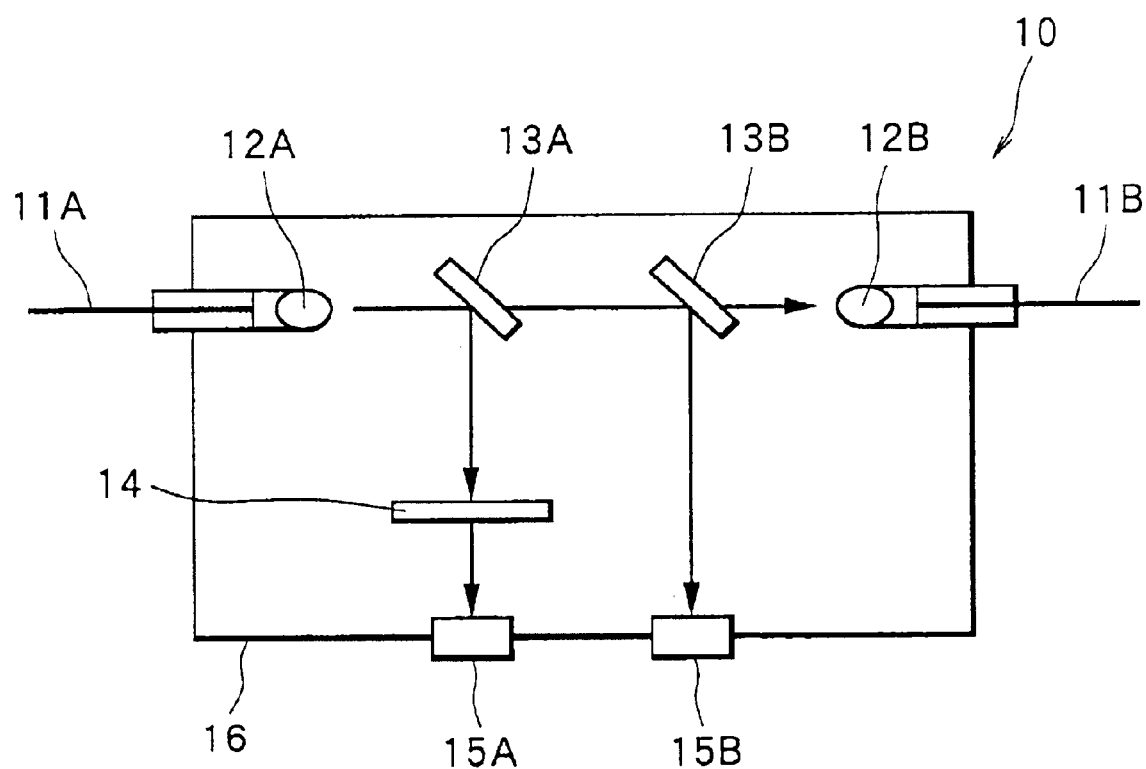
FIG. 7 is a schematic view showing a constitution of an embodiment of a wavelength detecting apparatus according to the present invention.

FIG. 7 is a schematic view showing a constitution of an embodiment of a wavelength detecting apparatus utilizing the airgap type etalon according to the present invention.

In FIG. 7, this wavelength detecting apparatus 10 is constituted of two optical fibers 11A, 11B, two collimator lenses 12A, 12B, two beam splitters 13A, 13B as first and second branching portions, an optical filter 14, two photodetectors 15A, 15B as first and second light receiving portions, and a frame 16 for holding these components at predetermined positions.

The optical fiber 11A is an optical transmission path for introducing an optical signal from the outside into the wavelength detecting apparatus 10. The collimator lens 12A collimates the diffused light emitted from the core of the optical fiber 11A into parallel light to thereby form a main light path, and sends this parallel light to the beam splitter 13A. This beam splitter 13A is tiltedly arranged by approximately 45° relative to the main light path so as to branch a part of the parallel light passed through the collimator lens 12A in a direction of about 90° to thereby send the thus branched light to the optical filter 14.

The airgap type etalon 1 of the first embodiment or the airgap type etalon 1' of the second embodiment is used for the optical filter 14. The optical filter 14 transmits the optical signal branched by the beam splitter 13A in accordance with a required wavelength characteristic to thereby send the thus transmitted light to the photodetector 15A. The photodetector 15A generates an electrical signal corresponding to the power of the optical signal transmitted through the optical filter 14.

Further, the optical signal transmitted the beam splitter 13A is sent to the beam splitter 13B. Similarly to the beam splitter 13A, this beam splitter 13B is tiltedly arranged by approximately 45° relative to the main light path so as to branch a part of the parallel light transmitted the beam splitter 13A in a direction of about 90° to thereby send the thus branched light to the photodetector 15B. The photodetector 15B generates an electrical signal corresponding to the power of the optical signal branched from the beam splitter 13B.

The optical signal of the main light path transmitted the beam splitter 13B is sent to the collimator lens 12B. This collimator lens 12B converges the transmitted light from the beam splitter 13B and couples the same to the core of the optical fiber 11B. This optical fiber 11B is an optical transmission path for outputting the optical signal coupled thereto via collimator lens 12B to the outside of the wavelength detecting apparatus 10.

In the wavelength detecting apparatus 10 having the aforementioned constitution, when white light having a wide wavelength band is input into the apparatus 10 via the optical fiber 11A, for example, this input light is collimated by the collimator lens 12A into parallel light, and a part of the parallel light is then branched by the beam splitter 13A, passed via the optical filter 14 and received by the photodetector 15A. At the photodetector 15A, there is obtained an electrical signal having a unimodal wavelength characteristic determined by the airgap type etalon to be utilized as the optical filter 14, as shown by a solid line in FIG. 8.

Meanwhile, a part of optical signal branched by the beam splitter 13B from the optical signal passed through the beam splitter 13A is directly received by the photodetector 15B without passing through any optical filter. At the photodetector 15B, there is obtained an electrical signal having a flat wavelength characteristic (reference wavelength characteristic) such as shown by a dashed line in FIG. 8. It is assumed here that the reflecting wavelength characteristics of the beam splitters 13A, 13B and the wavelength sensitivity characteristics of the photodetectors 15A, 15B are sufficiently flat in the wavelength range to be used.

Figure 8:
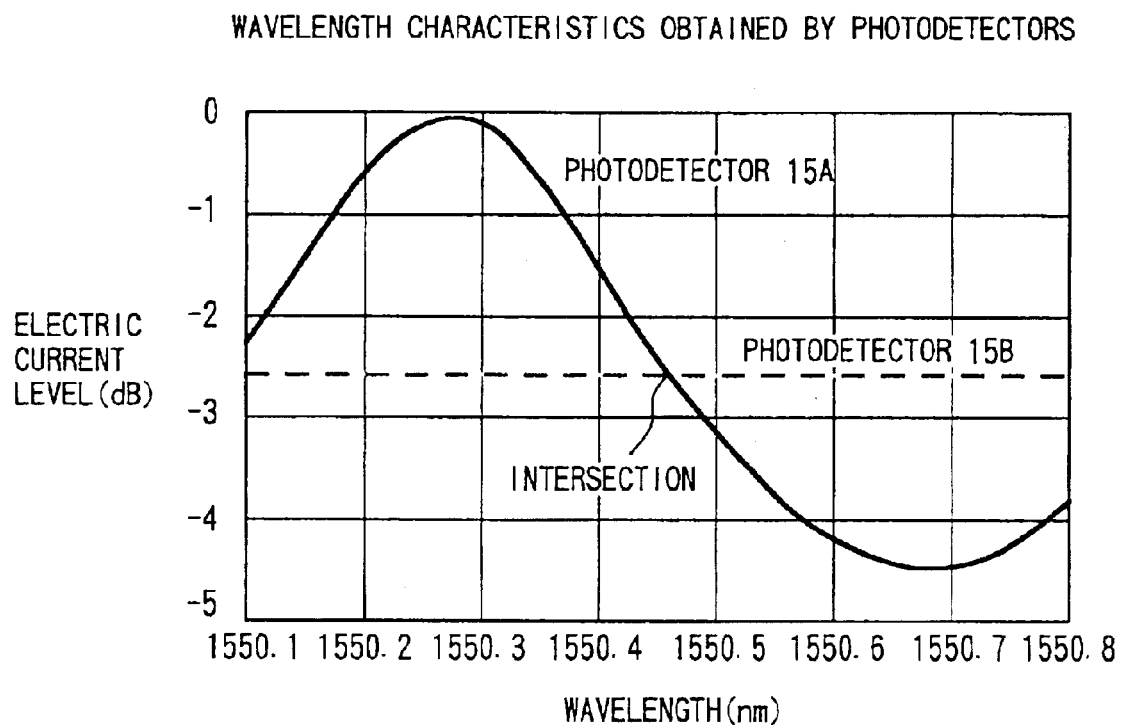
FIG. 8 is a diagram showing wavelength characteristics of electrical signals obtained at respective photodetectors, for the embodiment of the wavelength detecting apparatus of FIG. 7.

Here, when monochromatic light is now input into the optical fiber 11A while varying the wavelength thereof from 1550.2 nm to 1550.8 nm, for example, and an output electric current from the photodetector 15A is mathematically divided by an output electric current from the photodetector 15B, the division result becomes just 1 (one) at the wavelength of the intersection between the unimodal wavelength characteristic of the photodetector 15A and the reference wavelength characteristic of the photodetector 15B shown in FIG. 8. The wavelength giving the intersection can be electrically adjusted by varying an electric current level(s) of one or both of the photodetectors 15A, 15B, since the output electric current values of the photodetectors 15A, 15B can be level adjusted such as by resistors. Note, FIG. 8 shows an example where the electric current level of the photodetector 15B is adjustedly lowered relative to that of the photodetector 15A.

By detecting a wavelength at which the division result of the output electric currents of the photodetectors 15A, 15B becomes 1 (one) in the aforementioned manner, it becomes possible to detect that the wavelength of the optical signal input via the optical fiber 11A coincides with the wavelength corresponding to the aforementioned intersection. As concrete usage of such a wavelength detecting apparatus 10, it is possible that output light from a monochromatic light source such as a semiconductor laser diode is introduced into the main light path of the wavelength detecting apparatus 10, and a feedback control is applied to the monochromatic light source such that the division result of the output electric currents of the photodetectors 15A, 15B becomes 1, to thereby lock the wavelength of the output light of the monochromatic light source at a specific wavelength. In such usage, the wavelength detecting apparatus 10 functions as a so-called wavelength locker.

By constituting the optical filter 14 of an airgap type etalon having a low wavelength-temperature characteristic such as in the first embodiment or second embodiment, the wavelength detecting function of the apparatus of this embodiment allows the temperature dependency of the detection target wavelength to become substantially zero, to thereby remarkably stabilize the detection target wavelength relative to an environmental change such as temperature.

There will be described hereinafter a gain-equalizer (GEQ) utilizing the airgap type etalon according to the present invention.

Figure 9:
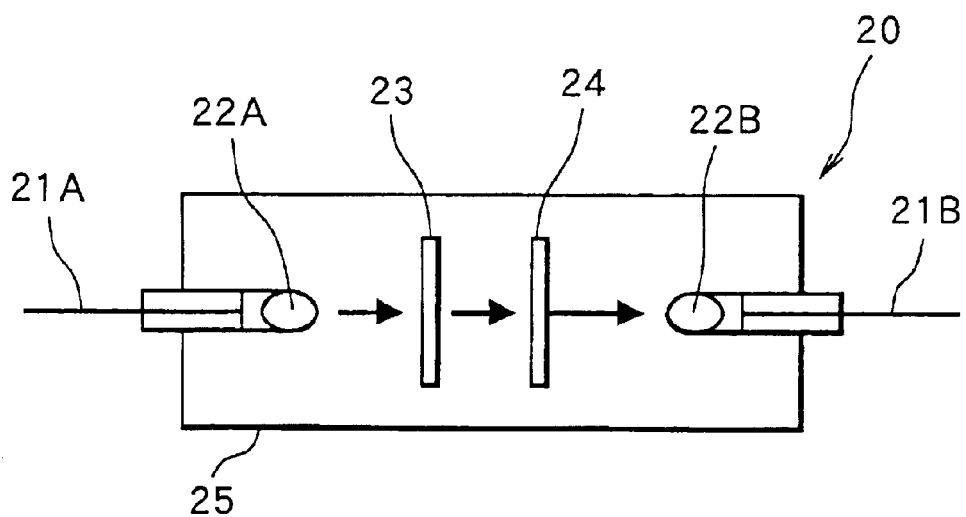
FIG. 9 is a schematic view showing a constitution of an embodiment of a gain-equalizer (GEQ) according to the present invention.

FIG. 9 is a schematic view showing a constitution of an embodiment of a gain-equalizer (GEQ) according to the present invention.

In FIG. 9, this GEQ 20 is constituted of two fibers 21A, 21B, two collimator lenses 22A, 22B, two optical filters 23, 24, and a frame 25 for holding these components at predetermined positions.

The fiber 21A is an optical transmission path for introducing an optical signal from the outside into the GEQ 20. The collimator lens 22A collimates the diffused light emitted from the core of the optical fiber 21A into parallel light, and sends this parallel light to the collimator lens 22B via the optical filters 23, 24. This collimator lens 22B converges the optical signal passed through the optical filter 24 and couples the same to the core of the optical fiber 21B. This optical fiber 21B is an optical transmission path for outputting the optical signal coupled thereto via the collimator lens 22B to the outside of the GEQ 20.

The adopted optical filters 23, 24 have periodical transmission wavelength characteristics shifted from each other by an approximately ½ cycle at a predetermined temperature, in which the transmission wavelength characteristics have mutually different temperature-dependencies. Etalons are preferable as optical filters having such characteristics.

There will be now explained in detail etalons to be utilized as the optical filters 23, 24.

In this embodiment, the optical characteristics required for the two etalons are such that FSR's are both on the order of 28 nm; maximum losses are both on the order of −0.9 dB, and respective periodical transmission wavelength characteristics are shifted from each other by an approximately ½ cycle at a predetermined temperature (such as 25° C.), and the wavelength-temperature characteristic of one of the transmission wavelength characteristics is relatively small (such as 13 pm/° C.) and that of the other is relatively large (such as 85 pm/° C.). Here, there shall be used etalons having relatively small and large wavelength-temperature characteristics, as the optical filters 23, 24, respectively. However, the wavelength-temperature characteristics of the optical filters 23, 24 are not limited thereto, and a setting reversed to the above is also possible.

As the etalon (optical filter 23) having a small wavelength-temperature characteristic, it is possible to adopt a common solid type etalon (not shown). The following Table 3 shows exemplary design values of the solid type etalon.

TABLE 3

| | Material | Refractive Index | Temperature Coefficient of Refractive Index (/° C.) | Linear Expansion Coefficient (/° C.) | Thickness (mm) |
|---|---|---|---|---|---|
| Solid Type Etalon | S-BAM9 | n = 1.595 | nt = 3.7 × $10^{-6}$ | $\alpha_1 = 6.1 \times 10^{-6}$ | $d_1 = 0.028$ |

The solid type etalon shown in Table 3 has an FSR of 28 nm and a wavelength-temperature characteristic of 13 pm/° C. In this respect, it is unnecessary to form a reflection augmenting coating on the surface of a gap material, since the glass surface reflection (Fresnel reflection) to be caused corresponding to the refractive index of the glass used as a gap material (S-BAM9; manufactured by Ohara Inc.) is on the order of 5% and the maximum loss is on the order of −0.9 dB.

There has been utilized herein a common solid type etalon as the etalon having the small wavelength-temperature characteristic. However, the present invention is not limited thereto, and it is also possible to adopt the airgap type etalon described in the first embodiment or second embodiment.

On the other hand, as the etalon (optical filter 24) having a relatively large wavelength-temperature characteristic, the airgap type etalon according to the present invention is utilized. The constitution of this airgap type etalon is identical with that of the first embodiment (see FIG. 1) or the second embodiment (see FIG. 5), and is obtained by changing the values of respective parameters so as to increase the wavelength-temperature characteristic. The following Table 4 shows exemplary parameter design values of the airgap type etalon.

TABLE 4

| | Material | Refractive Index | Linear Expansion Coefficient (/° C.) | Thickness (mm) |
|---|---|---|---|---|
| transparent parallel flat plate 3 | S-BSM9 | 1.595 | $\alpha_1 = 6.1 \times 10^{-6}$ | $d_1 = 0.735$ |
| parallel flat plate 4 | S-PBL26 | 1.547 | $\alpha_2 = 8.9 \times 10^{-6}$ | $d_2 = 0.780$ |

The airgap type etalon shown in Table 4 has an FSR of 28 nm and a wavelength-temperature characteristic of 85 pm/° C. It is also possible here to omit reflection augmenting coatings to be formed on the surfaces of the flat plate 3 and flat spacer 4, respectively, since each glass surface reflection (Fresnel reflection) to be caused corresponding to the refractive indexes of the glass (S-BSM9, S-PBL26; manufactured by Ohara Inc.) for the flat plate 3 and flat spacer 4 is on the order of 5% and the maximum loss is on the order of −0.9 dB.

Note, such an etalon as described above having the aforementioned relatively large wavelength-temperature characteristic can be hardly realized by a conventional technique. Concretely, even if the etalon having the large wavelength-temperature characteristic of 85 pm/° C. is to be constituted as a conventional solid type etalon, it is impossible to obtain a desired wavelength-temperature characteristic since commercially available glass can provide a wavelength-temperature characteristic of 20 pm/° C at the largest. Further, considering a situation where the etalon at issue is to be constituted as the conventional airgap type etalon shown in FIG. 21, it can be estimated that an etalon having a desired large wavelength-temperature characteristic is obtained by adopting a material having a linear expansion coefficient on the order of $5 \times 10^{-5}$/° C. as a gap material. However, materials having such a large linear expansion coefficient are generally included in organic substances only. It is already stated that organic substances are impractical due to instability thereof to the environment and due to poor machinability thereof into a flat surface.

There will be now described the function of the GEQ (gain-equalizer) 20 of this embodiment, by considering an example where a gain-temperature characteristic of an EDFA is passively compensated by the GEQ 20.

Generally, the gain wavelength characteristic of an EDFA has a complex shape having gain peaks near 1535 nm and 1555 nm. This kind of gain wavelength characteristic has been conventionally offset (compensated) such as by providing a fixed GEQ having a transmission wavelength characteristic opposite to the gain wavelength characteristic, to thereby realize an EDFA having a flat gain wavelength characteristic at a predetermined temperature. However, the gain wavelength characteristic of such an EDFA is changed by the change of an ambient temperature.

Figure 10:
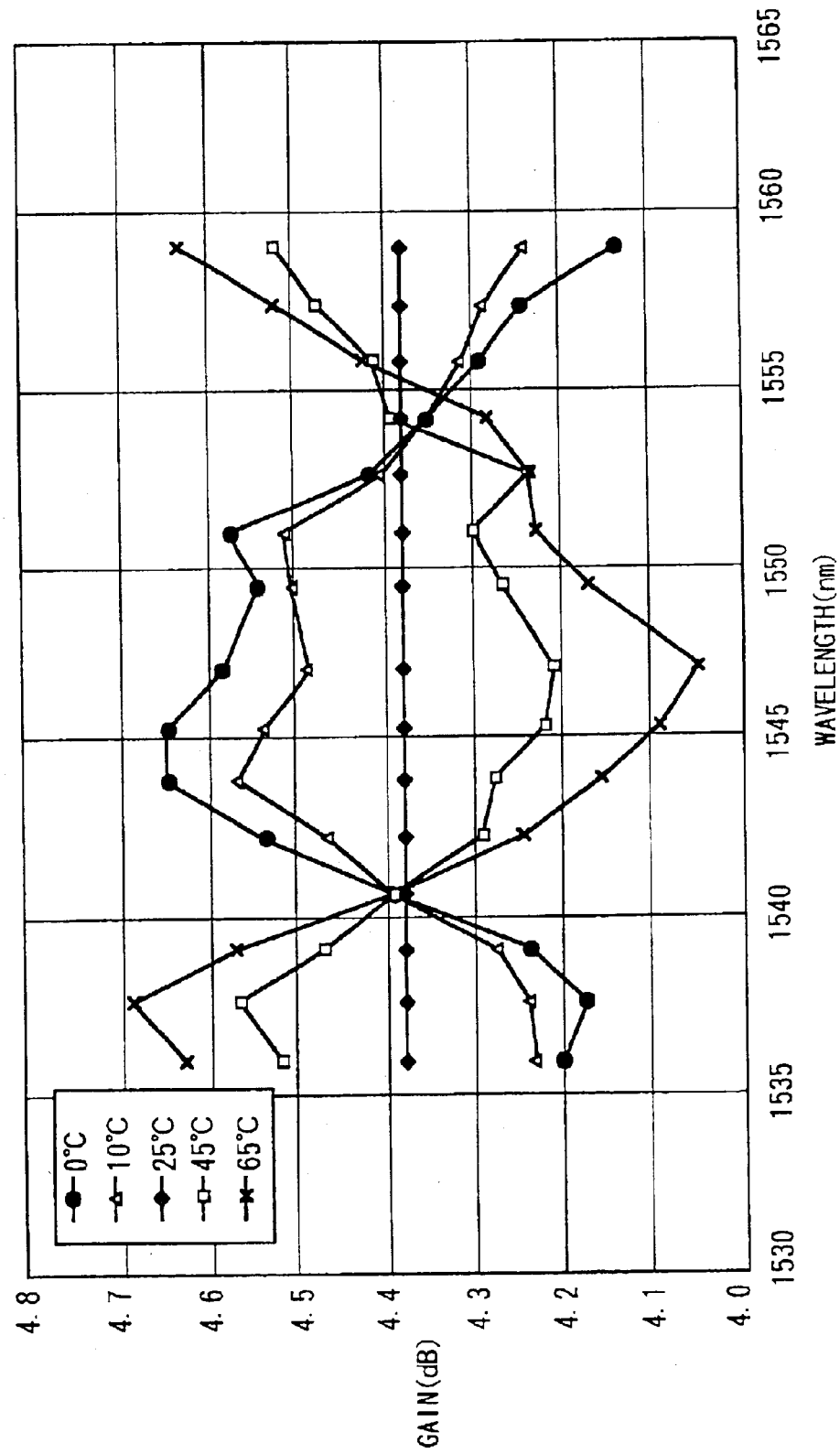
FIG. 10 is a diagram showing a gain-temperature characteristic of a general EDFA.

For example, when the temperature is changed between 0° C. and 65° C. in a situation where the transmission wavelength characteristic of a fixed GEQ has been optimized so that a gain wavelength characteristic of an EDFA is fully flattened at 25° C., the gain-temperature characteristic (standardized gain-temperature characteristic at 25° C.) of the EDFA varies as shown in FIG. 10. Namely, the gain-temperature characteristic of the EDFA exhibits such a behavior that the amplitude of a standing wave fixed at specific wavelengths is changed so that the shape itself of the wavelength characteristic is changed corresponding to a temperature change. Such a gain-temperature characteristic of the EDFA can be hardly compensated by utilizing a temperature characteristic (wavelength shift) of a single optical filter (etalon).

Thus, the gain-equalizer (GEQ) 20 of this embodiment combiningly utilizes two etalons having wavelength characteristics different from each other and wavelength-temperature characteristics different from each other, so as to realize the aforementioned compensation of the gain-temperature characteristic of the EDFA.

Figure 11:
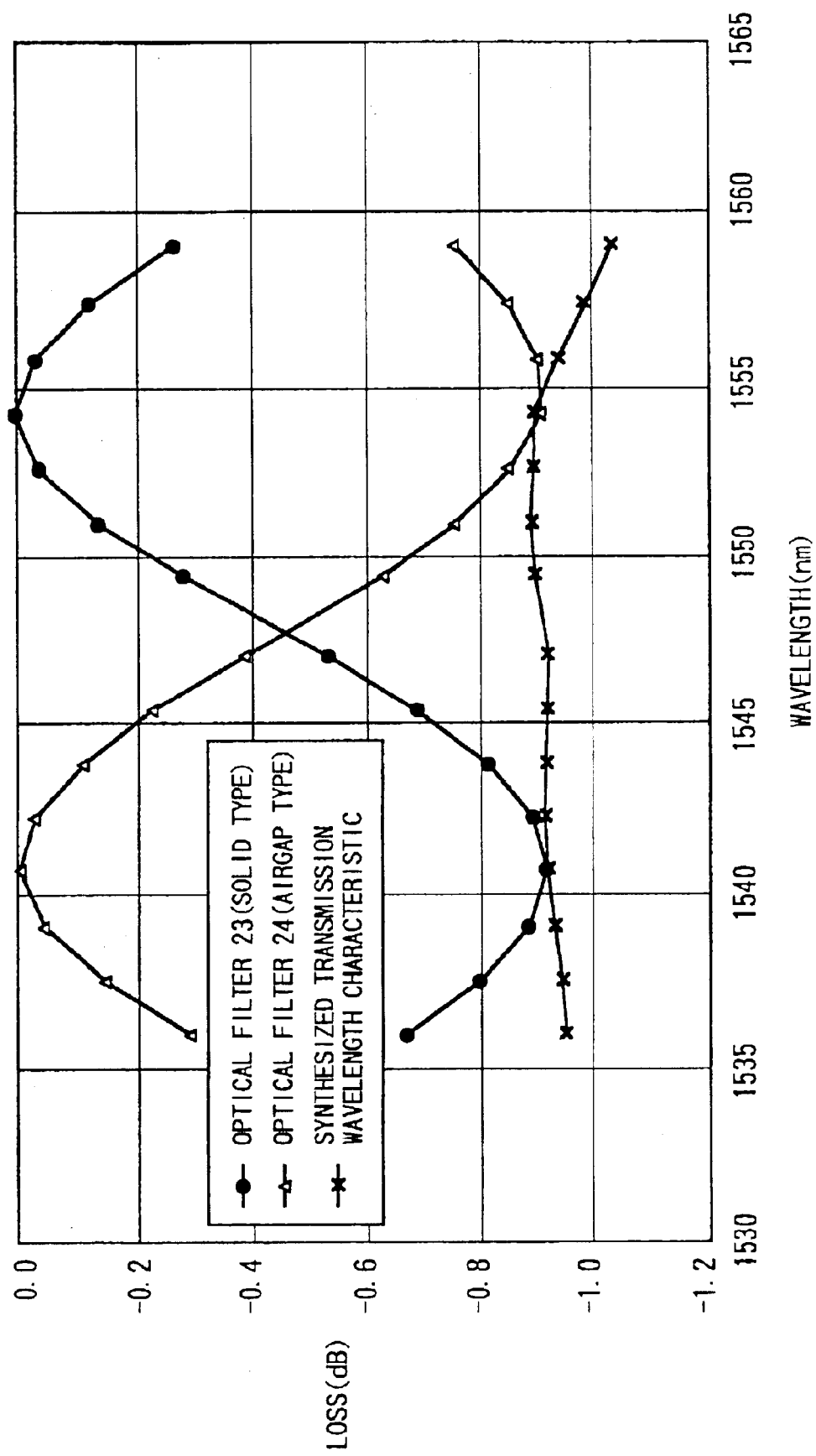
FIG. 11 is a diagram showing transmission wavelength characteristics of optical filters 23, 24 at 25° C. as well as a transmission wavelength characteristic obtained by synthesizing these characteristics, for the embodiment of the gain-equalizer of FIG. 9.

FIG. 11 is a diagram showing respective transmission wavelength characteristics of the optical filters 23, 24 at 25° C. as well as a transmission wavelength characteristic obtained by synthesizing these characteristics, in the gain-equalizer 20.

As shown in FIG. 11, the transmission wavelength characteristics of the optical filters 23, 24 are periodical and shifted from each other by an approximately ½ cycle (=π). Further, the synthesized transmission wavelength characteristic is designed to be substantially flat within a wavelength band (substantially from 1535 nm to 1560 nm here) of the EDFA, so as not to affect the gain-temperature characteristic of the EDFA at 25° C.

Figure 12:
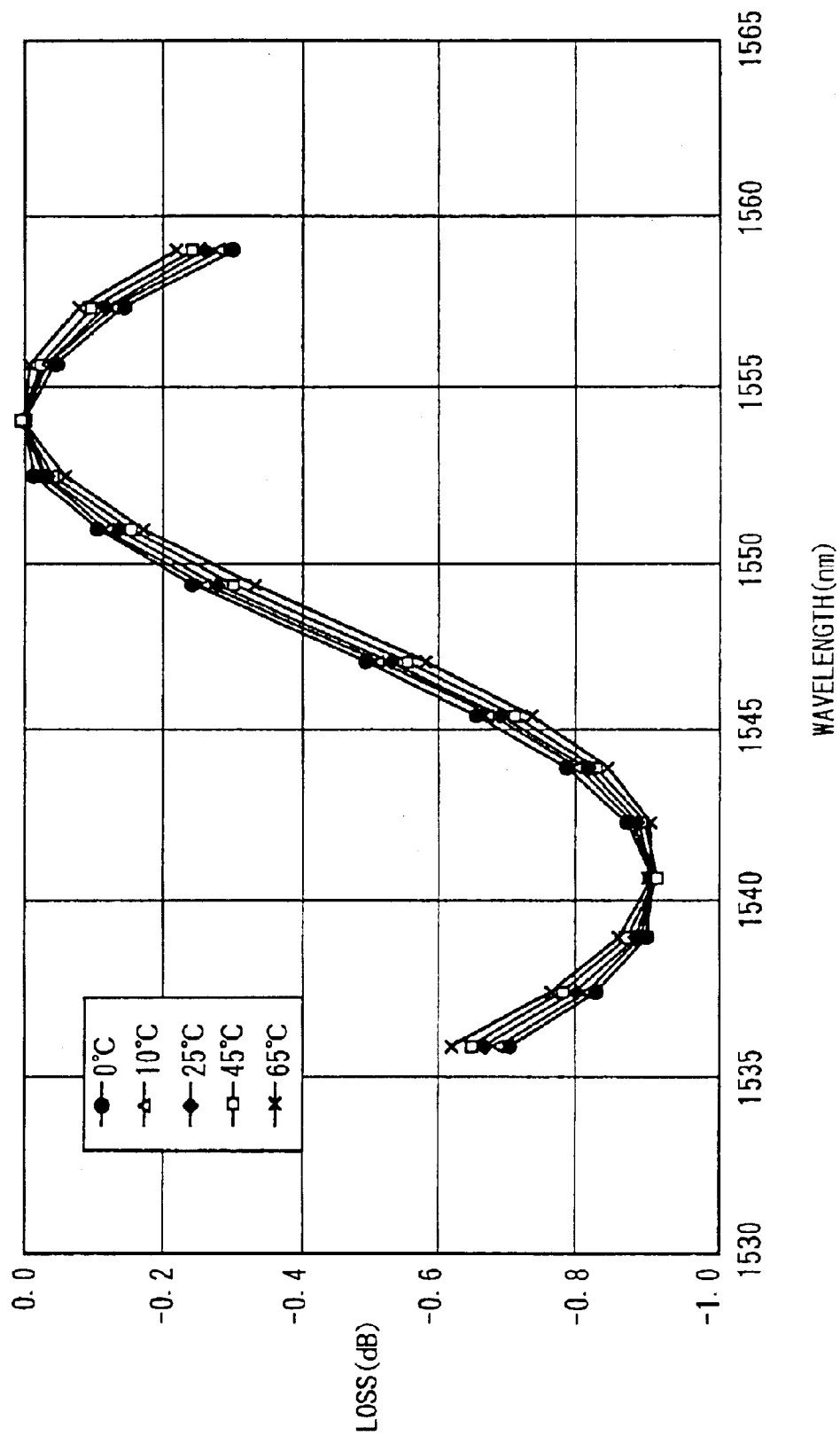
FIG. 12 is a diagram showing a wavelength-temperature characteristic of the optical filter 23, for the embodiment of the gain-equalizer of FIG. 9.
Figure 13:
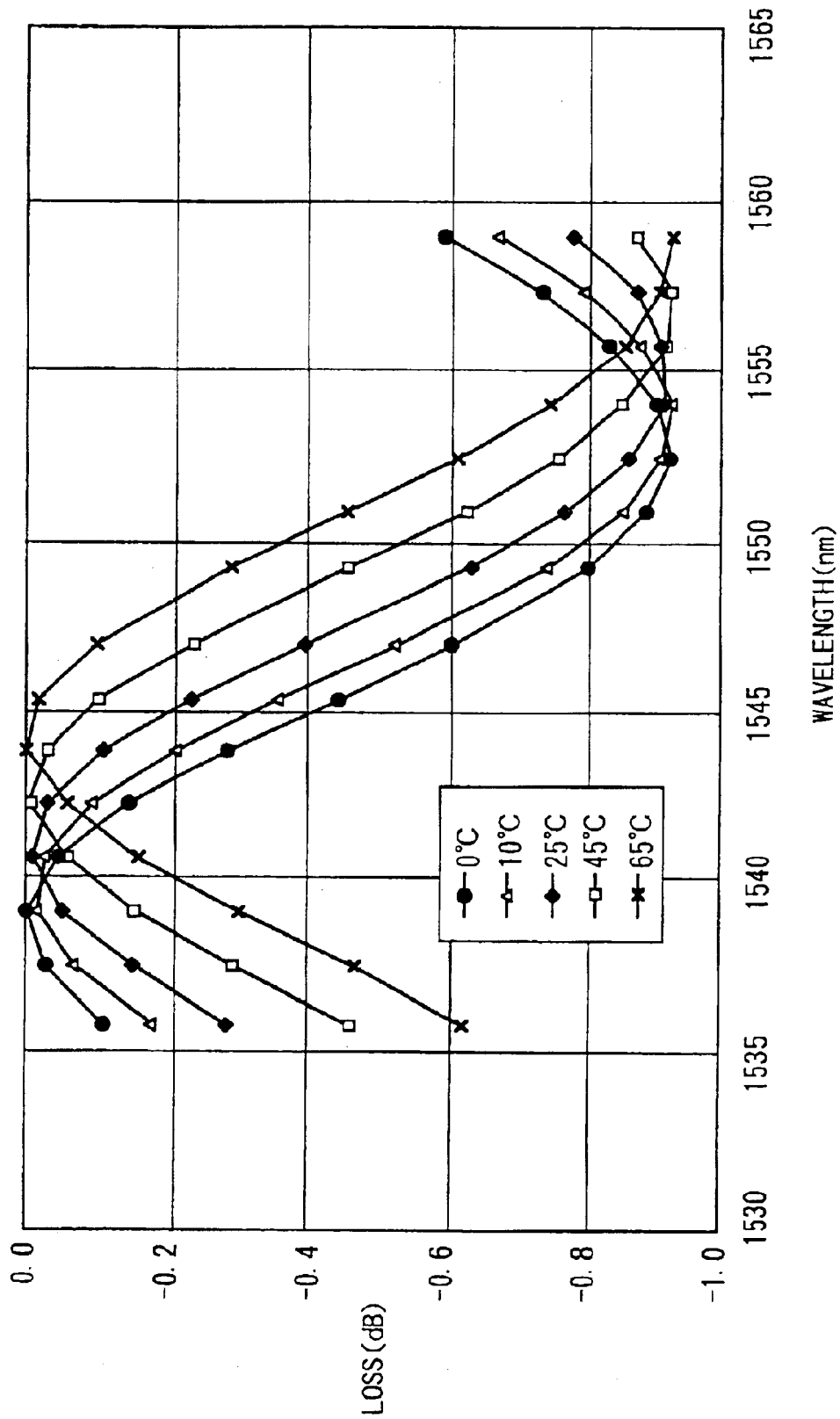
FIG. 13 is a diagram showing a wavelength-temperature characteristic of the optical filter 24, for the embodiment of the gain-equalizer of FIG. 9.
Figure 14:
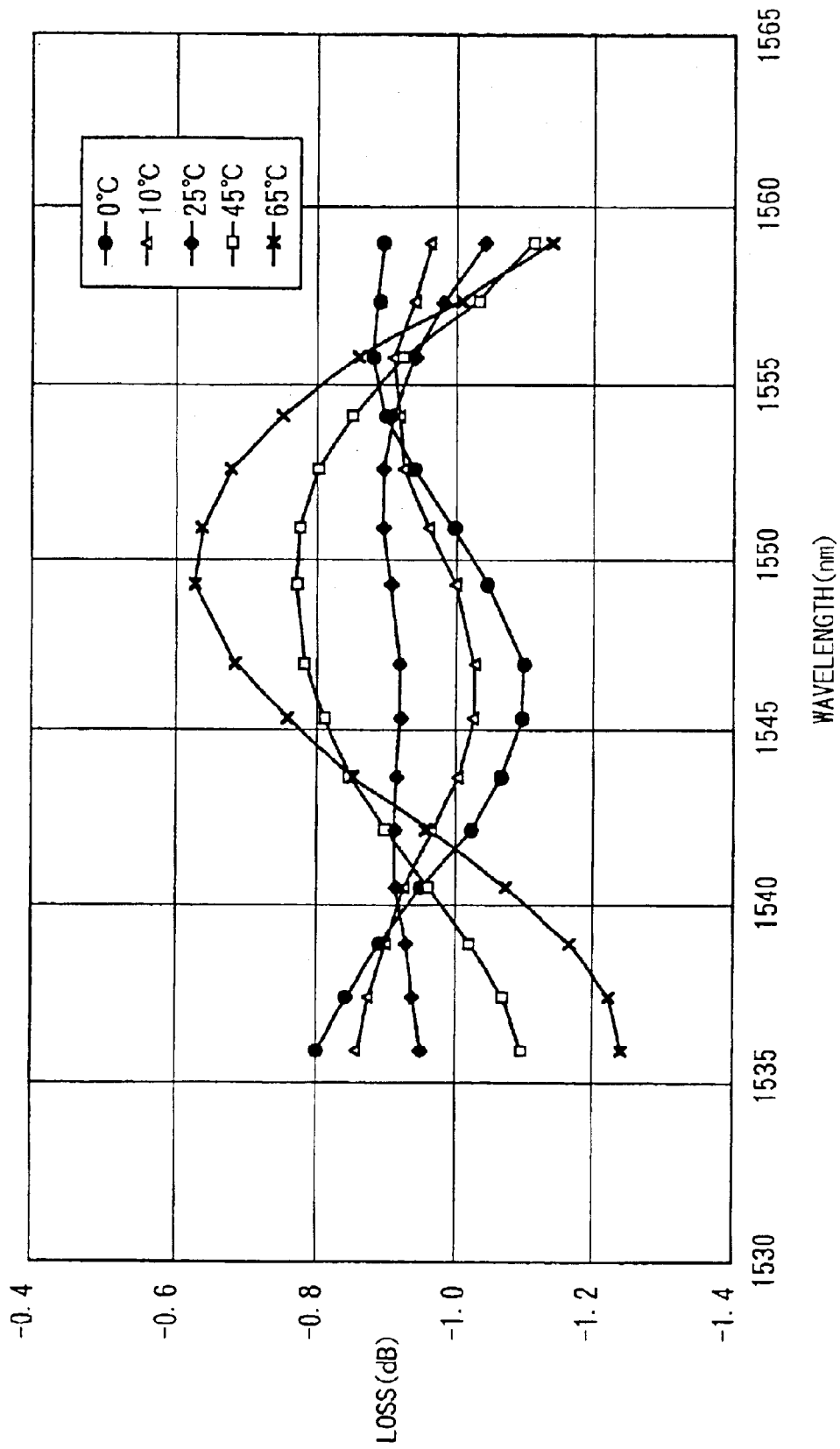
FIG. 14 is a diagram showing a wavelength-temperature characteristic obtained by synthesizing characteristics of the optical filters 23, 24, for the embodiment of the gain-equalizer of FIG. 9.

FIGS. 12 through 14 are diagrams showing transmission wavelength characteristics upon a temperature change (0° C. to 65° C.), i.e., FIG. 12 showing the wavelength-temperature characteristic of the optical filter 23 (solid type etalon), FIG. 13 showing that of the optical filter 24 (airgap type etalon), and FIG. 14 showing the wavelength-temperature characteristic obtained by synthesizing the characteristics of these optical filters, respectively.

FIG. 12 shows that the optical filter 23 has a relatively small amount (on the order of 13 pm/° C.) of wavelength shift due to a temperature change, and FIG. 13 shows that the optical filter 24 has a relatively large amount (on the order of 85 pm/° C.) of wavelength shift due to a temperature change. Further, FIG. 14 shows that the synthesized transmission wavelength characteristic has a wavelength characteristic which is substantially reverse to the gain-temperature characteristic of the EDFA shown in FIG. 10. Namely, the temperature dependency of the transmission wavelength characteristic obtained by combining the optical filters 23, 24 exhibits such a behavior that the amplitude of a standing wave fixed at specific wavelengths varies in a manner reverse to the gain-temperature characteristic of the EDFA.

When the GEQ 20 (FIG. 9) constituted of the aforementioned optical filters 23, 24 is connected to an EDFA having a gain wavelength characteristic flattened at a predetermined temperature (25° C.) by a fixed GEQ, there is realized compensation of the gain-temperature characteristic of the EDFA.

Figure 15:
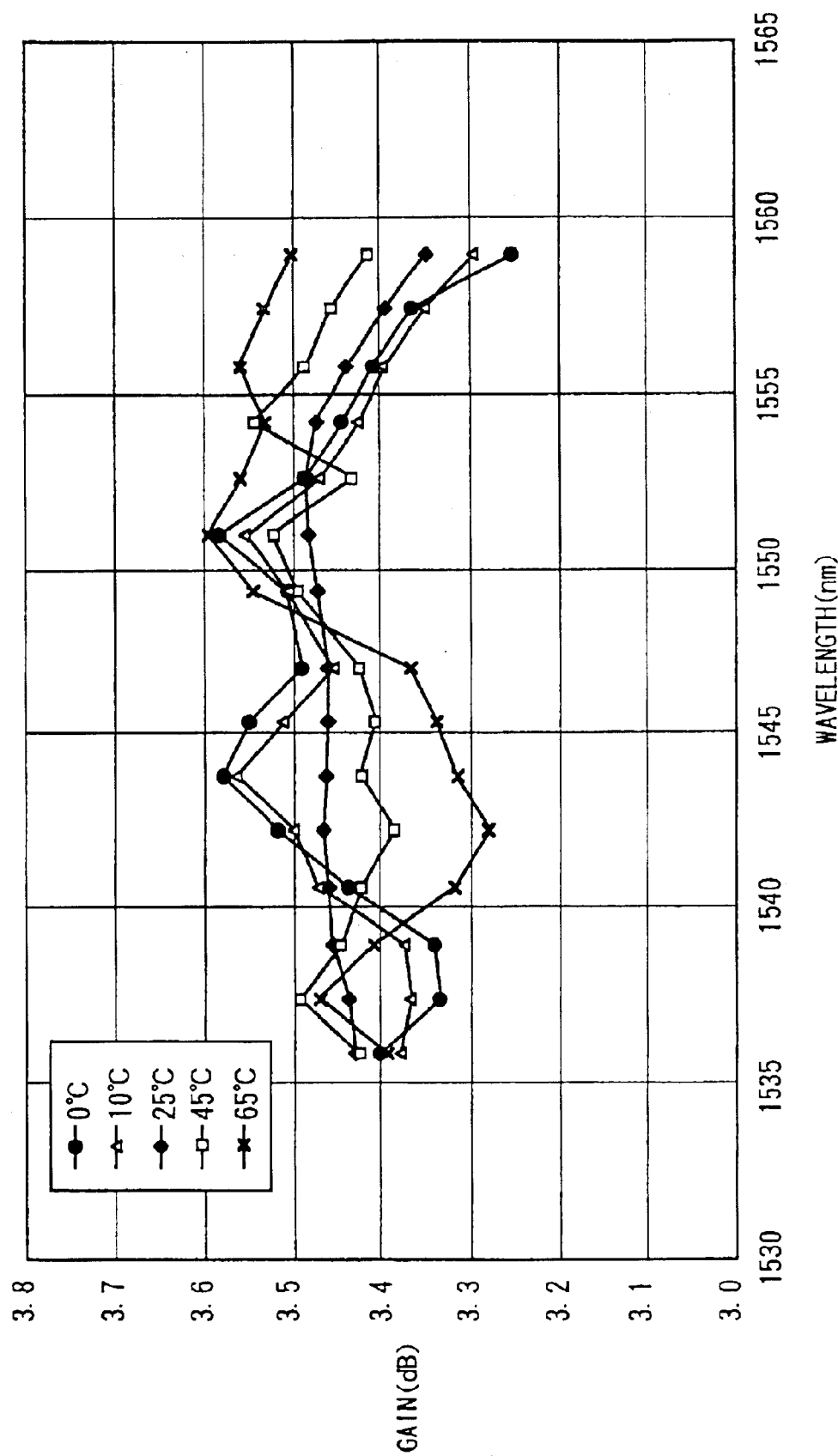
FIG. 15 is a diagram showing a wavelength-temperature characteristic of an EDFA after compensation, in the embodiment of the gain-equalizer of FIG. 9.

FIG. 15 is a diagram showing a wavelength-temperature characteristic (0° C. to 65° C.) of the EDFA after compensation by the GEQ 20. It is assumed here that the temperatures of the EDFA and GEQ 20 shall be equalized to each other corresponding to a temperature change of the environment. As shown in FIG. 15, the gain-temperature characteristic of the EDFA is offset by the temperature dependency of the transmission wavelength characteristic of the GEQ 20, so that the wavelength-temperature characteristic of the EDFA is remarkably flattened. Concretely, the wavelength flatness is increased (i.e., the gain deviation within the wavelength band is reduced to less than a half) as compared to the gain-temperature characteristic of the EDFA without the GEQ 20.

As described above, the GEQ 20 of this embodiment is connected to an EDFA, for example, so that the characteristic of the EDFA can be passively flattened even when the gain wavelength characteristic of the EDFA is changed due to a temperature change. By applying such an EDFA connected with the GEQ 20 to a WDM transmission apparatus, deviations of optical SNR's for optical signals at respective wavelengths are scarcely caused, thereby achieving an extremely useful effect.

There will be now described a wavelength characteristic varying apparatus utilizing the airgap type etalon according to the present invention.

Figure 16:
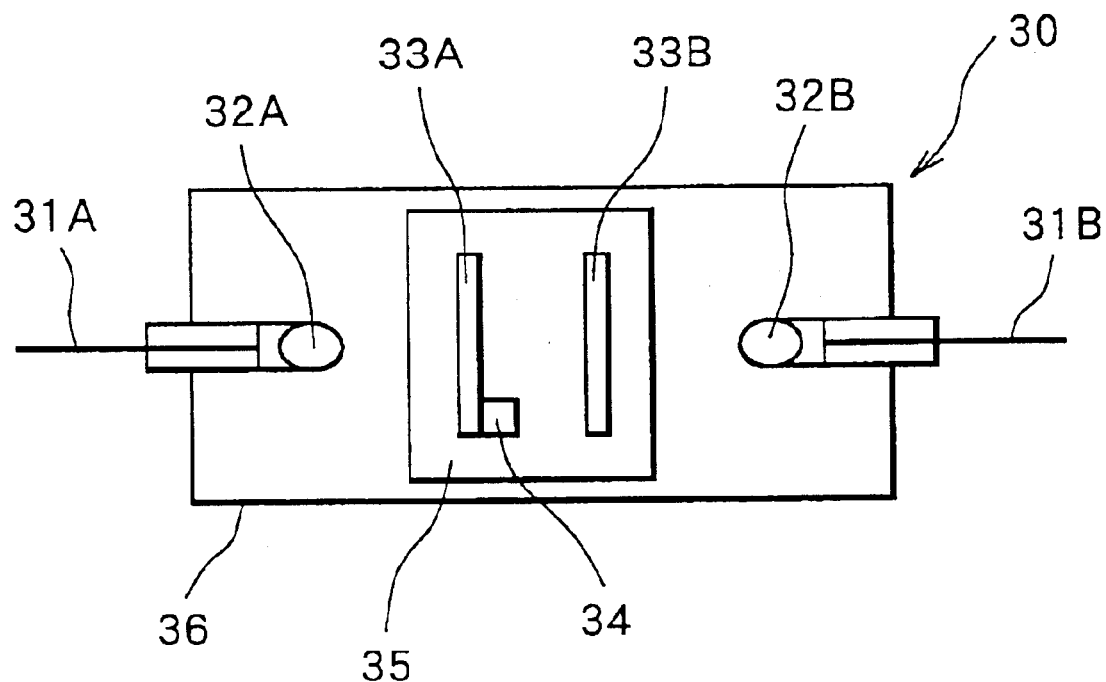
FIG. 16 is an upper plan view showing a constitution of an embodiment of a wavelength characteristic varying apparatus according to the present invention.
Figure 17:
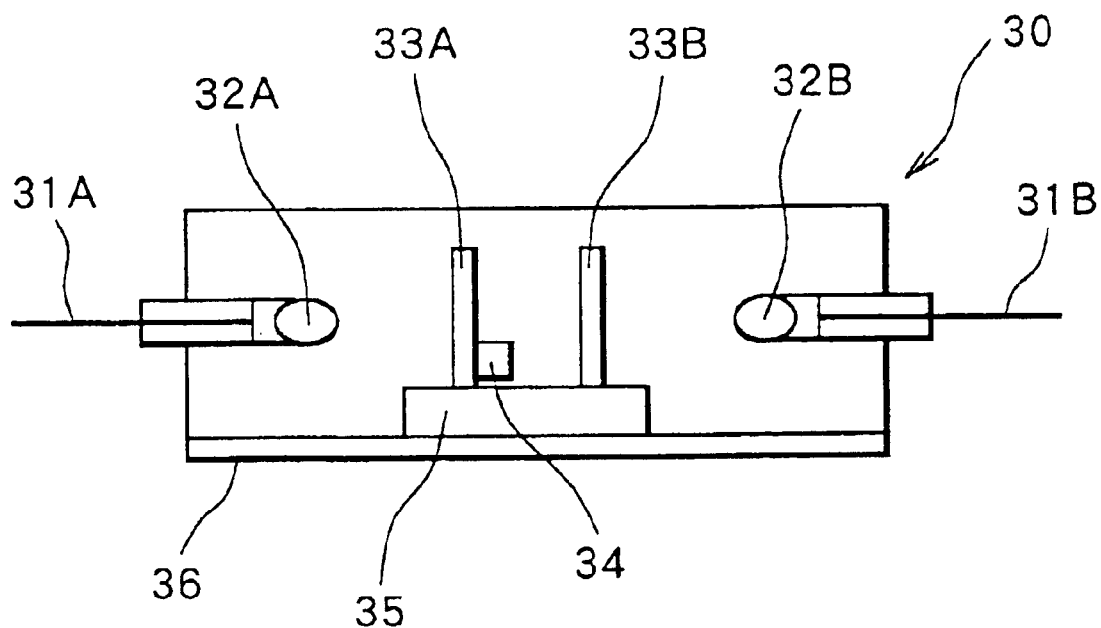
FIG. 17 is a side sectional view showing the constitution of the embodiment of the wavelength characteristic varying apparatus of FIG. 16.

FIGS. 16 and 17 are diagrams showing a constitution of an embodiment of a wavelength characteristic varying apparatus according to the present invention, and FIGS. 16 and 17 are a plan view and a side sectional view, respectively.

In FIGS. 16 and 17, this wavelength characteristic varying apparatus 30 is constituted of two fibers 31A, 31B, two collimator lenses 32A, 32B, two optical filters 33A, 33B, a thermal detector 34, a thermal controlling element 35, and a frame 36 for holding these components at predetermined positions. The thermal detector 34 and thermal controlling element 35 cooperatively act as temperature controlling means.

The fiber 31A is an optical transmission path for introducing an optical signal from the outside into the wavelength characteristic varying apparatus 30. The collimator lens 32A collimates the diffused light emitted from the core of the optical fiber 31A into parallel light, and sends this parallel light to the collimator lens 32B via optical filters 33A, 33B. This collimator lens 32B converges the optical light passed through the optical filter 33B and couples the same to the core of the optical fiber 31B. This optical fiber 31B is an optical transmission path for outputting the optical signal coupled thereto via the collimator lens 32B to the outside of the wavelength characteristic varying apparatus 30.

As the optical filters 33A, 33B, the airgap type etalons of the present invention are adopted, respectively. The optical characteristics required for the optical filters 33A, 33B will be described later.

The thermal detector 34 is attached to the optical filter 33A in this embodiment, to thereby detect the temperature of the optical filter 33A. It is possible to adopt a platinum resistor sensor, for example, as the thermal detector 34. The thermal controlling element 35 is placed on the frame 36, and the optical filters 33A, 33B are placed on the thermal controlling element 35 at predetermined positions, respectively. This thermal controlling element 35 acts to control the temperatures of the optical filters 33A, 33B corresponding to the temperature detected by the thermal detector 34, and can be concretely formed of a Peltier element, for example. In using a Peltier element, there is provided a temperature control circuit (not shown) for controlling an electric current value to be flown through the Peltier element in accordance with the temperature detected by the thermal detector 34.

The reason why the thermal detector 34 is provided for the optical filter 33A only in the aforementioned constitution is that the thermal conductivities of the optical filters 33A, 33B are considered to be substantially the same so that the temperatures of the optical filters 33A, 33B placed on the thermal controlling element 35 are considered to be substantially the same.

There will be now described in detail the airgap type etalons to be used for the optical filters 33A, 33B, respectively.

The optical characteristics required for the two etalons to be used in the wavelength characteristic varying apparatus 30 are such that: FSR's are both in a range of about 100 nm to about 120 nm; maximum losses are both on the order of −4.5 dB; and the wavelength-temperature characteristics of both etalons are extremely large (about 500 pm/° C.), and the shift directions (directions of wavelength shift) of these wavelength-temperature characteristics are opposite to each other. The constitutions of the respective airgap type etalons are identical with that of the first embodiment (see FIG. 1) or that of the second embodiment (see FIG. 5 described above), but the parameters have been varied so as to extremely increase the wavelength-temperature characteristics. The following Table 5 shows exemplary parameter design values of the optical filters 33A, 33B.

TABLE 5

| | | Material | Linear Expansion Coefficient (/° C.) | Thickness (mm) |
|---|---|---|---|---|
| Optical Filter 33A | transparent parallel flat plate 3 | S-LAM60 | $\alpha_{11} = 5.4 \times 10^{-6}$ | $d_{11} = 0.389$ |
| | parallel flat plate 4 | S-FPL51 | $\alpha_{12} = 1.33 \times 10^{-5}$ | $d_{12} = 0.400$ |
| Optical Filter 33B | transparent parallel flat plate 3 | S-FPL51 | $\alpha_{21} = 1.33 \times 10^{-5}$ | $d_{21} = 0.388$ |
| | parallel flat plate 4 | S-LAM60 | $\alpha_{22} = 5.4 \times 10^{-6}$ | $d_{22} = 0.400$ |

By the setting shown in Table 5, the wavelength-temperature characteristics of the optical filters 33A and 33B become +500 pm/° C. and −500 pm/° C., respectively. Further, to realize an optical characteristic having a maximum loss on the order of −4.5 dB, it is sufficient to set the reflectances of the reflection augmenting coatings 3B, 5B to be on the order of 25%.

Note, similarly to what has been explained for the aforementioned embodiment of the GEQ, it is very difficult to realize the above listed etalons having extremely large wavelength-temperature characteristics, insofar as based on the conventional techniques.

There will be now described the function of the wavelength characteristic varying apparatus 30.

In this wavelength characteristic varying apparatus 30, the temperatures of the optical filters 33A, 33B are determined in accordance with the detection result by the thermal detector 34, and the thermal controlling element 35 positively controls the temperatures of the optical filters 33A, 33B, to thereby realize a variable transmission wavelength characteristic.

Figure 18:
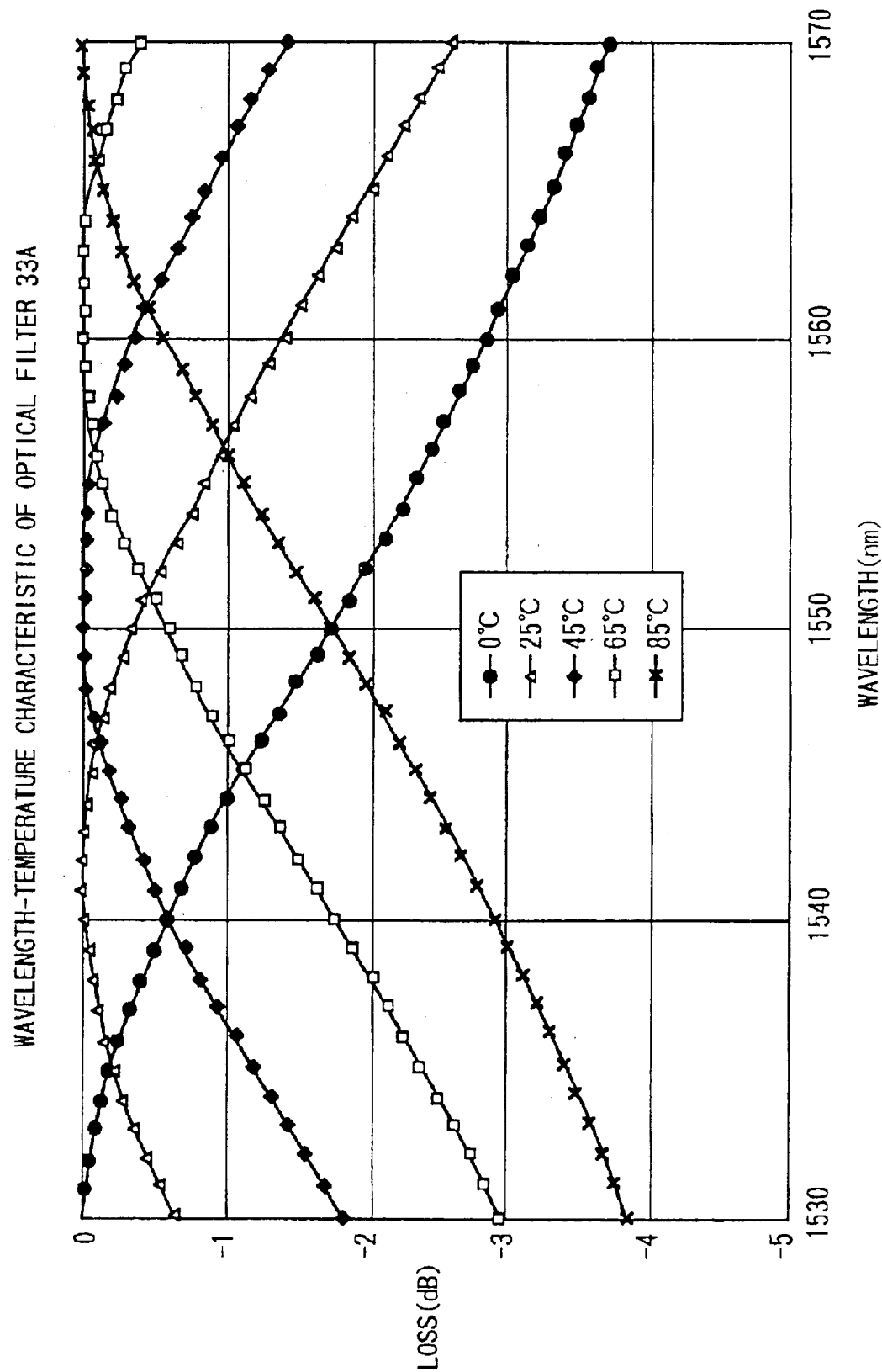
FIG. 18 is a diagram showing a wavelength-temperature characteristic of an optical filter 33A, for the wavelength characteristic varying apparatus of FIG. 16.
Figure 19:
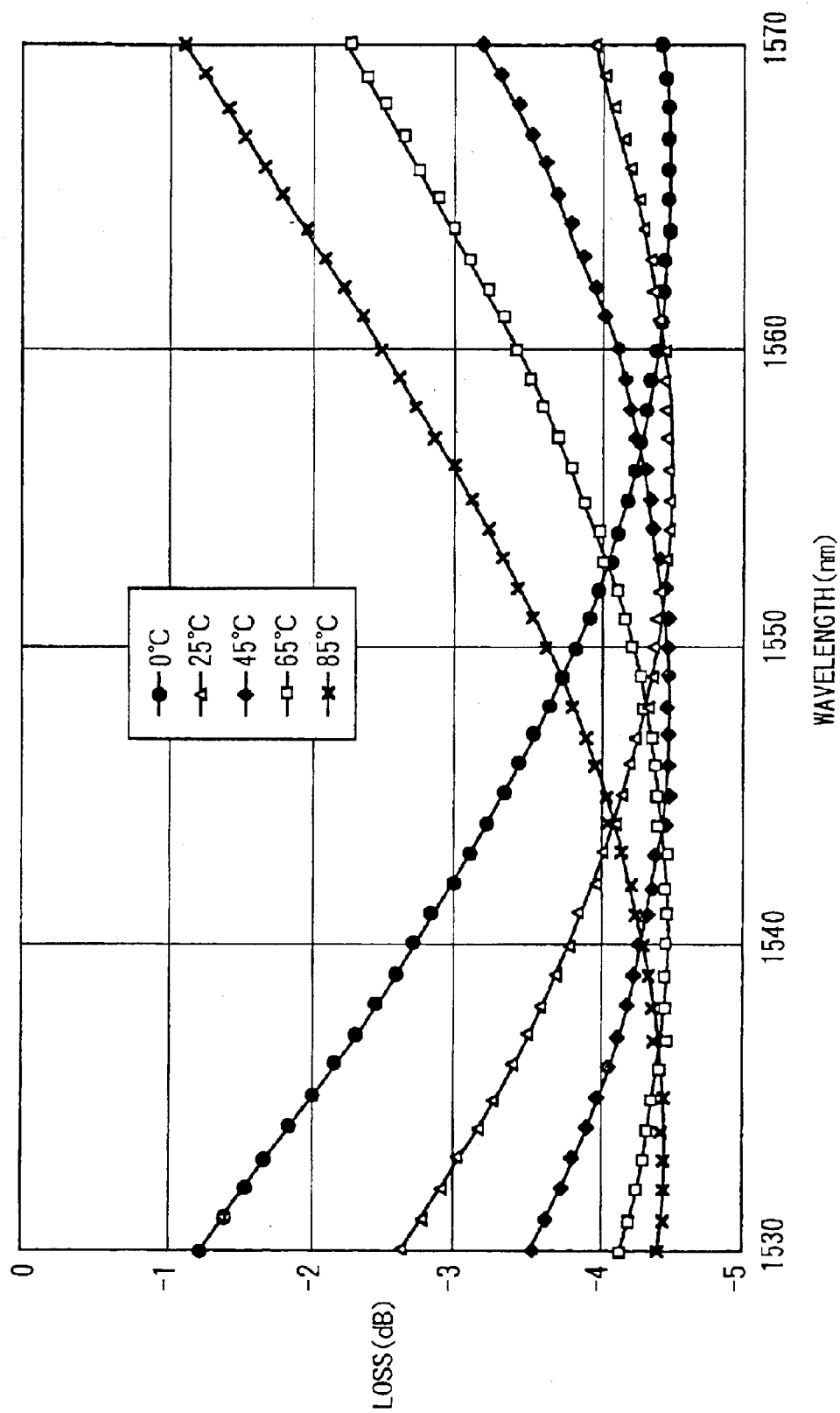
FIG. 19 is a diagram showing a wavelength-temperature characteristic of an optical filter 33B, for the embodiment of the wavelength characteristic varying apparatus of FIG. 16.
Figure 20:
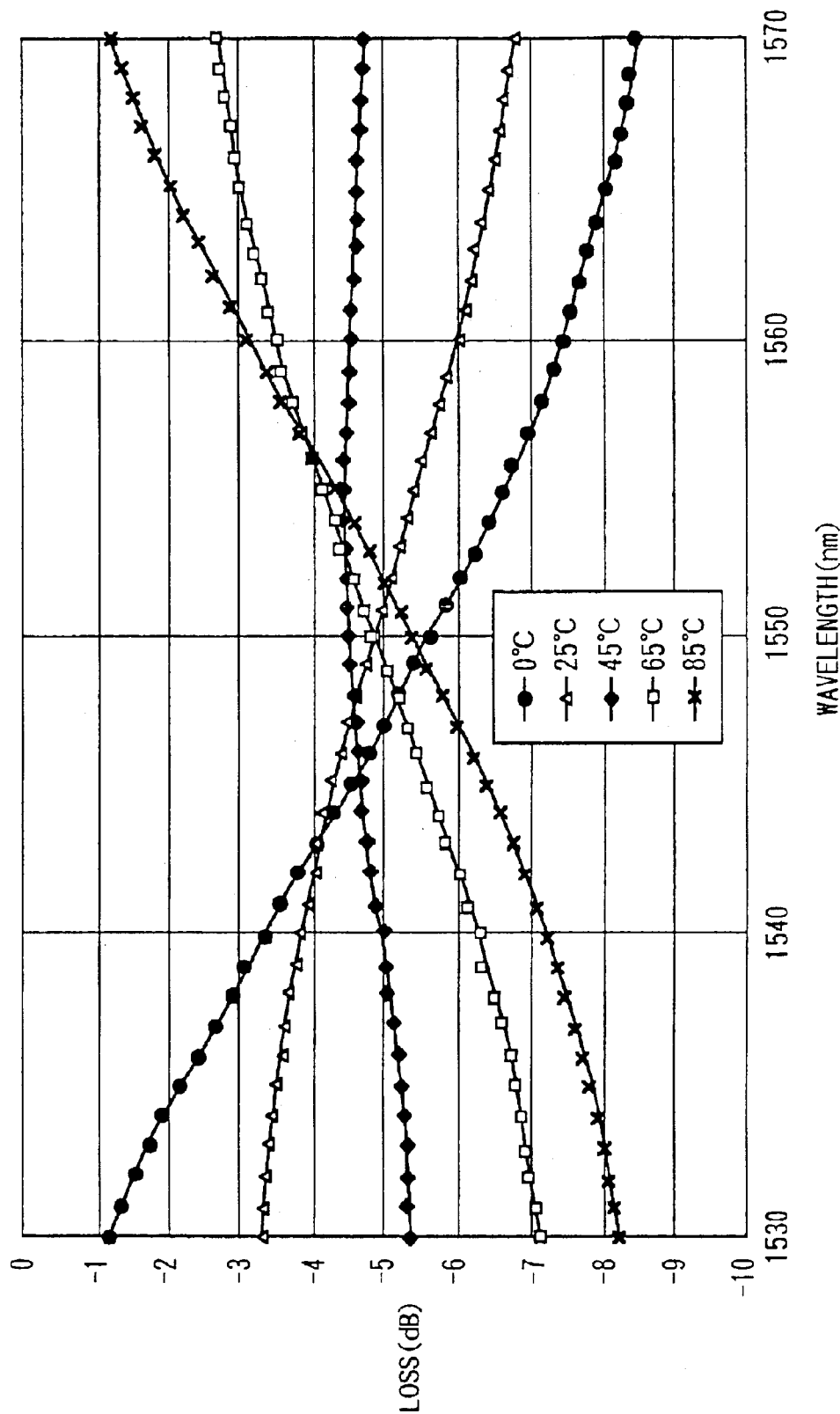
FIG. 20 is a diagram showing a wavelength-temperature characteristic obtained by synthesizing characteristics of the optical filters 33A, 33B, for the embodiment of the wavelength characteristic varying apparatus of FIG. 16.

FIGS. 18 through 20 are diagrams showing transmission wavelength characteristics upon a temperature change (0° C. to 65° C.), i.e., FIG. 18 showing the wavelength-temperature characteristic of the optical filter 33A, FIG. showing that of the optical filter 33B, and FIG. 20 showing the wavelength-temperature characteristic obtained by synthesizing the characteristics of these optical filters, respectively.

FIGS. 18 and 19 show that the optical filters 33A, 33B have extremely large amounts of wavelength shift (±500 pm/° C.) due to a temperature change, and the directions of wavelength shift are opposite to each other. Further, FIG. 20 shows that the synthesized transmission wavelength characteristic has an inclination on the order of ±7 dB within the wavelength range of 1530 nm to 1570 nm.

According to the wavelength characteristic varying apparatus 30 of this embodiment, it becomes possible to positively vary the inclination amount of the synthesized transmission wavelength characteristic of the optical filters 33A, 33B, by controlling the temperatures of the optical filters 33A, 33B.

In the wavelength characteristic varying apparatus 30, the temperatures of the optical filters 33A, 33B have been controlled to be the same, by one thermal detector 34 and one thermal controlling element 35. However, it is also possible to separately control the temperatures of the optical filters 33A, 33B, such as by providing the optical filters 33A, 33B with respective thermal detectors and thermal controlling elements. In this situation, airgap type etalons having identical wavelength shift directions can be adapted as the optical filters 33A, 33B such that the temperatures of the optical filters 33A, 33B are controlled in the opposite directions to each other.

What is claimed is:

1. An airgap type etalon comprising:

a fixing member having at least one flat surface;

a first parallel member, which is transparent to incident light and has parallel flat surfaces, one of said parallel flat surfaces thereof being joined to said flat surface of said fixing member;

at least one second parallel member, which has parallel flat surfaces in which a distance between said parallel flat surfaces thereof is greater than a distance between said parallel flat surfaces of said first parallel member, and has an expansion coefficient different from that of said first parallel member, one of the flat surfaces of said second parallel member being joined to said flat surface of said fixing member so as to surround the outer periphery of said first parallel member; and a transparent member, which is transparent to incident light and has opposite flat surfaces, one of said flat surfaces thereof being joined to the other flat surface of said second parallel member, said other flat surface being opposite to the joined surface to said fixing member;

wherein a Fabry-Perot interferometer is formed based on an airgap positioned between the flat surface of said first parallel member and the flat surface of said transparent member facing each other, and wherein a distance between the parallel flat surfaces and the expansion coefficient of each of said first and second parallel members, are set based on a variation of an air refractive index in the airgap due to a temperature fluctuation, so that when a temperature rises, a distance between the surfaces of said first parallel member and said transparent member that face each other, is set to be longer than an initial value before the temperature rises, to enable the compensation of a wavelength temperature dependency of a wavelength characteristic of incident light.

2. An airgap type etalon of claim 1, wherein said fixing member has a through-hole for passing light therethrough, said first parallel member is formed with an antireflection coating on one flat surface thereof, and this flat surface formed with said antireflection coating is joined to said flat surface of said fixing member around said through-hole, and said transparent member is formed with an antireflection coating on the other flat surface thereof opposite to the joined surface to said second parallel member.

3. An airgap type etalon of claim 1, wherein said fixing member is transparent to incident light, and is formed with an antireflection coating on a surface opposite to said flat surface thereof, and said transparent member is formed with an antireflection coating on the other flat surface thereof opposite to the joined surface to said second parallel member.

4. An airgap type etalon of claim 1, wherein reflection augmenting coatings are formed on said flat surfaces of said first parallel member and said transparent member facing each other, respectively.

5. An airgap type etalon of claim 1, wherein temperature dependency of said transmission wavelength characteristic is set to be 25 pm/° C. or more.

6. A gain-equalizer, comprising:

a plurality of optical filters having periodical transmission wavelength characteristics shifted from one another by an approximately ½ cycle at a predetermined temperature, in which the respective transmission wavelength characteristics have mutually different temperature dependencies, such that a synthesized transmission wavelength characteristic to be obtained by synthesizing the transmission wavelength characteristics of said plurality of optical filters is passively varied corresponding to a temperature change;

wherein at least one of said plurality of optical filters is constituted by employing said airgap type etalon of claim 5.

7. An optical amplifier employing said gain-equalizer of claim 6, wherein said gain-equalizer has a transmission wavelength characteristic reverse to a gain wavelength characteristic of said optical amplifier, so that the gain wavelength characteristic of said optical amplifier is flattened irrespectively of a temperature change.

8. A wavelength characteristic varying apparatus comprising:

a plurality of optical filters having periodical transmission wavelength characteristics, in which the transmission wavelength characteristics have mutually different temperature dependencies; and temperature controlling means for controlling the temperature of said plurality of optical filters such that an inclination amount of a transmission wavelength characteristic obtained by synthesizing the transmission wavelength characteristics of said plurality of optical filters can be positively varied by a temperature control by said temperature controlling means, wherein said plurality of optical filters are constituted by employing at least two airgap type etalons of claim 5, and the shift directions of temperature dependencies of transmission wavelength characteristics of said airgap type etalons are opposite to each other.

9. An optical amplifier employing said wavelength characteristic varying apparatus of claim 8, in which a gain wavelength characteristic of said optical amplifier changes corresponding to an operating condition, wherein said wavelength characteristic varying apparatus has a transmission wavelength characteristic reverse to a change of the gain wavelength characteristic of said optical amplifier corresponding to the operating condition, so that the gain wavelength characteristic of said optical amplifier is flattened irrespectively of the operating condition.

10. A wavelength detecting apparatus comprising:

a first branching portion and a second branching portion to extract branched light from a main light path, respectively;

an optical filter to transmit the branched light from said first branching portion and to give a wavelength characteristic to the thus transmitted light;

a first light receiving portion to convert the transmitted light from said optical filter into an electrical signal; and a second light receiving portion to convert the branched light from said second branching portion into an electrical signal, wherein said optical filter is constituted by employing said airgap type etalon of claim 1.

11. A wavelength locker employing said wavelength detecting apparatus of claim 10, said wavelength locker comprising:

a semiconductor laser diode the wavelength of which varies proportionally to temperatures;

an introducing portion to introduce monochromatic light from said semiconductor laser diode into said main light path; and a controlling portion to feedback control the temperature of said semiconductor laser diode so that the mathematical division result between said electrical signal from said first light receiving portion and said electrical signal from said second light receiving portion becomes constant, to thereby fix the wavelength of the monochromatic light at a specific wavelength.

12. An airgap type etalon comprising:

a fixing member having a surface;

a first parallel member which is transparent to incident light and has parallel surfaces and an expansion coefficient, one of said parallel surfaces being coupled to the surface of said fixing member;

a second parallel member having parallel first and second surfaces which are spaced apart by a distance which is greater than a distance between the surfaces of said first parallel member, said second parallel member having an expansion coefficient, the first surface of said second parallel member being coupled to the surface of said fixing member; and a transparent member having a surface coupled to the second surface of said second parallel member, so that an airgap is formed between said first parallel member and said transparent member the distance between the parallel surfaces and the expansion coefficient of each of said first and second parallel members being set based on a variation of an air refractive index in the airgap due to a temperature fluctuation, so that when a temperature rises, a distance between the surfaces of said first parallel member and said transparent member that face each other, is set to be longer than an initial value before the temperature rises, to enable compensation for a wavelength temperature dependency of a wavelength characteristic of incident light.

* * * * *